United States Patent [19]
Matsuoka et al.

[11] Patent Number: 5,949,540
[45] Date of Patent: Sep. 7, 1999

[54] OPTICAL MEASURING DEVICE, AND SPECTROSCOPIC LIGHT EQUIPMENT AND PHOTODETECTOR SUITABLE THEREFORE

[75] Inventors: Koji Matsuoka; Kazushi Ohtsuka; Keiichi Fukada; Xu Kexin, all of Kyoto, Japan

[73] Assignees: Kyoto Daiichi Kagaku Co., Ltd, Kyoto; Kurashiki Boseki Kabushiki Kaisha, Kurashiki, both of Japan

[21] Appl. No.: 08/903,154

[22] Filed: Jul. 30, 1997

[30] Foreign Application Priority Data

| Aug. 2, 1996 | [JP] | Japan | 8-220639 |
| Aug. 30, 1996 | [JP] | Japan | 8-248903 |
| Oct. 30, 1996 | [JP] | Japan | 8-305823 |

[51] Int. Cl.$^6$ .................. G01J 3/28; G01J 3/50
[52] U.S. Cl. .......................... 356/326; 250/226
[58] Field of Search ............ 250/226; 356/326, 356/319

[56] References Cited

U.S. PATENT DOCUMENTS

| 3,927,944 | 12/1975 | Iwahashi et al. | 356/320 |
| 4,449,821 | 5/1984 | Lee | 356/319 |
| 5,296,910 | 3/1994 | Cole | 356/336 |
| 5,444,528 | 8/1995 | Puschell | 356/73 |
| 5,477,321 | 12/1995 | Johnson | 356/319 |

FOREIGN PATENT DOCUMENTS

WO 91/14157  9/1991  WIPO.

*Primary Examiner*—Robert H. Kim
*Assistant Examiner*—Zandra V. Smith
*Attorney, Agent, or Firm*—Nikaido, Marmelstein, Murray & Oram LLP

[57] ABSTRACT

A light equipment irradiating a target with light adjusts light from a light source in a light source optical system and introduces the same into an acousto-optic device, for separating the same into its spectral components and modulating the same in the acousto-optic device. A condensing optical system condenses first order diffractive light outgoing from the acousto-optic device, so that an irradiation optical system irradiates a target with the same. A photodetection device comprises a photoreceiving part and a data processing part, so that the photoreceiving part converts a signal responsive to the fluctuation of modulated measuring light to a plurality of signals of different degrees of amplification simultaneously outputting same. The data processing part selects a non-saturated value of an amplifier or an A-D convertor while maintaining the largest degree of amplification from these signals, and lock-in processes same with a modulation frequency modulating the measuring light. A specific substance in a scattering substance can be non-invasively measured with high accuracy.

37 Claims, 23 Drawing Sheets

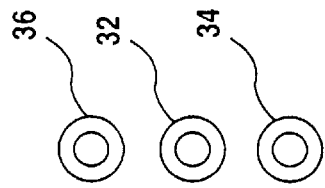
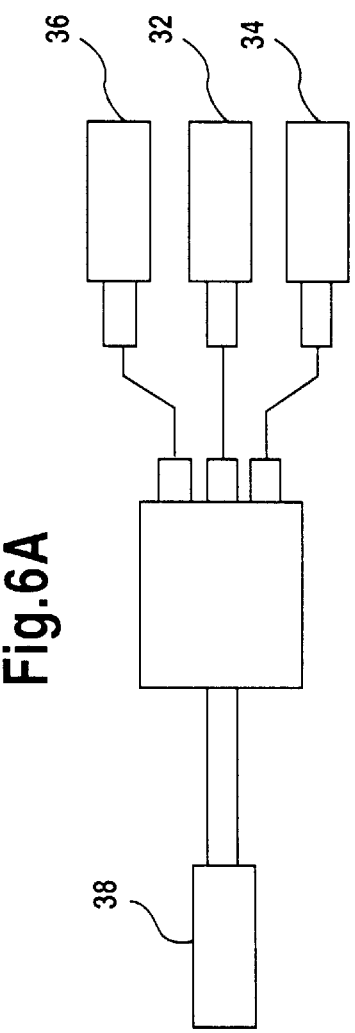
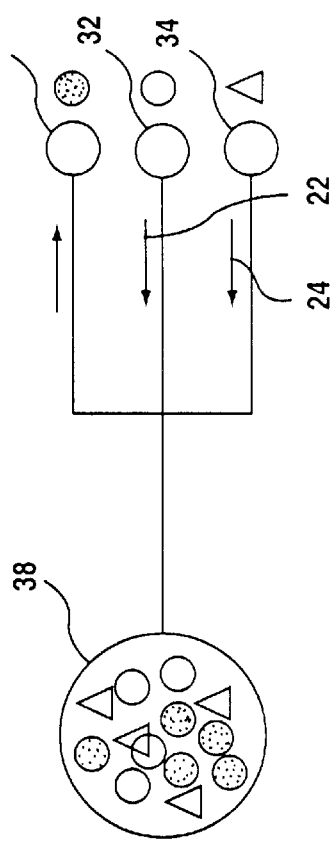

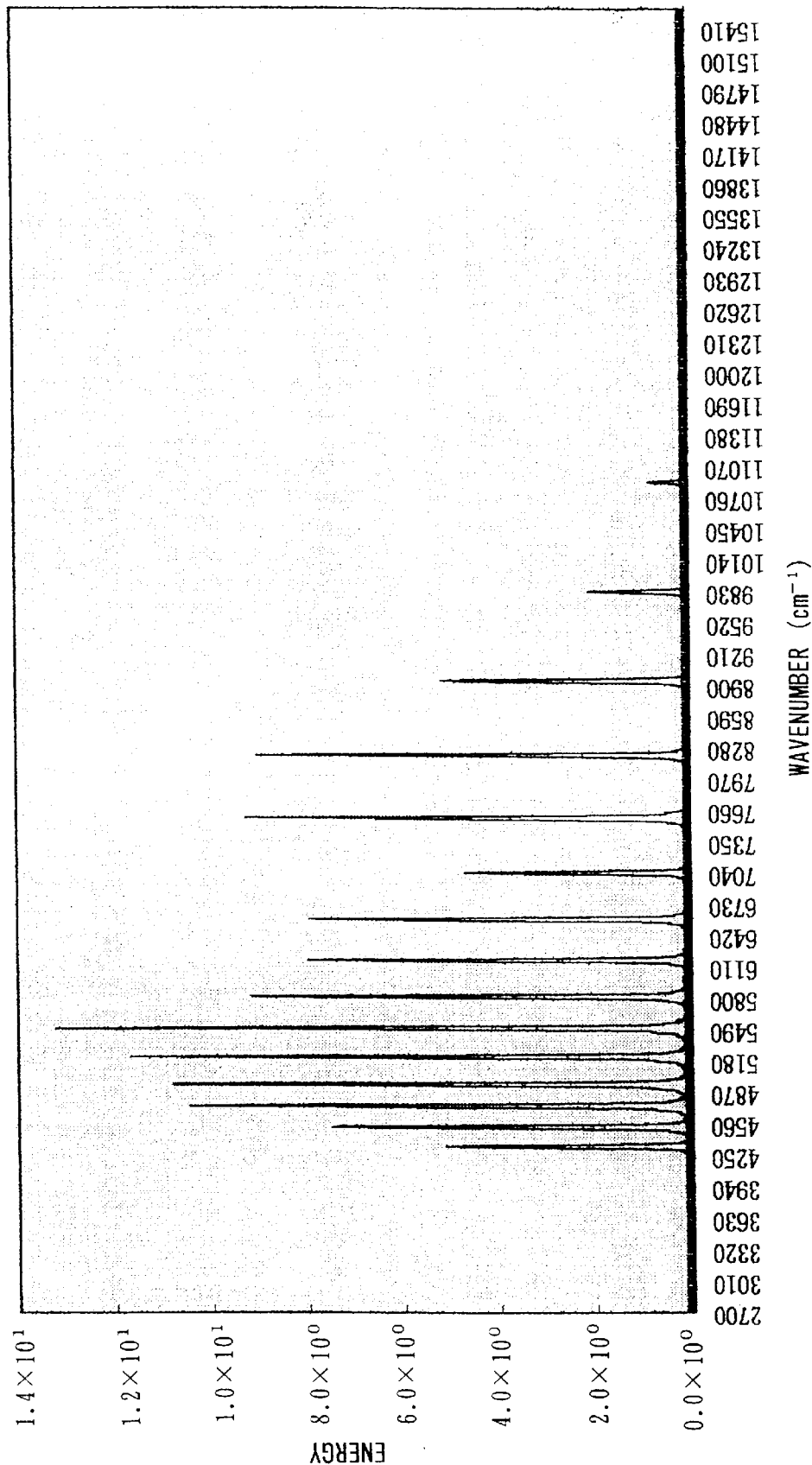

OPTICAL MEASURING DEVICE, AND SPECTROSCOPIC LIGHT EQUIPMENT AND PHOTODETECTOR SUITABLE THEREFORE

BACKGROUND OF THE INVENTION

1. Field of the Invention

The present invention relates to a measuring device for optically measuring a specific substance such as glucose or hemoglobin in blood or urine or sugar in a fruit, for example, contained in a scattering substance such as a liquid, food or a human body, a spectroscopic light equipment employed for generating the light of a specific wavelength in such a measuring device, and a photodetection device for performing spectroscopic analysis, particularly a photodetection device which can eliminate a drift or a random noise component from a feeble measuring signal and amplify the signal at a high signal-to-noise ratio.

2. Description of the Background Art

In recent years, optical measurement has been performed by irradiating a target with light and then employing output light from the target. Throughout the specification, the term "output light" indicates any light entering a light scattering target and outgoing from that target, including so-called transmitted light (outgoing in the direction of the incidence of the light) as well as so-called reflected light (outgoing in the opposite direction to the direction of incidence).

In such measurement, the intensity of the output light obtained by irradiating the target is measured for every wavelength in order to obtain information in the target. Therefore, it is necessary to separate the light applied to the target, or the output light, into its spectral components.

Various systems are employed as spectroscopic means. A generally-employed system of separating continuous wavelength light into its spectral components by a FTIR (Fourier transform infrared spectrophotometer) or movement of a part such as an optical grating has the problem of lengthening the measuring time and something like a drift of the light quantity is apt to occur, effecting accuracy. Spectral separation at a separated wavelength employing a filter as a spectroscopic element or an LD (laser diode) or an LED (light emitting diode) as a light source takes much time if the wavelength number is increased, not only increasing the cost but also necessitating a change in the hardware used, such as the filter or the light source itself, leading to an increase in the number of necessary parts.

On the other hand, an acousto-optic device (acousto-optic tunable filter: AOTF) is employed as a spectroscope in combination with a continuous light source and the spectroscope. The acousto-optic device is obtained by sticking an acoustic wave transducer to an acousto-optic crystal, in order to select a wavelength transmitted through the crystal by an acoustic wave frequency (radio frequency (RF)). The acousto-optic device has no mechanically moving parts, and is capable of wavelength scanning at a high speed. A spectrophotometer employing the acousto-optic device is commercially available.

In relation to a measuring method employing the acousto-optic device as a spectroscopic element, there are a method of measuring the difference of absorption of two wavelengths (EP401453A1) and a method of measuring the differing spectrum of a tissue of a target in states with different volumes of blood (U.S. Pat. No. 5,372,135), for example.

While the relative measuring method such as two-wavelength measurement, can measure a component with high accuracy, in a simple system such as an aqueous solution system containing only a single component, it is extremely difficult to measure respective components accurately in respect to complicated systems, such as food or a human body, which are made up of a number of components. When targets differ, changes in a single component may remain the same but the remaining components change at different ratios, and hence it is difficult to accurately extract change of a noted component merely from the difference between values measured at two wavelengths. Furthermore, it is necessary to extract extremely feeble signals, while errors result from change in conditions such as pressures, surface reflectances, path lengths etc. for the blood volumes of the measured portions, and hence it is also difficult to extract a single signal of a noted component from signals which incorporate such fluctuation errors.

When the output light from a sample is measured and the measured light is so extremely feeble that the detection signal and noise intensity are equivalent to one another, an output signal of a high signal-to-noise ratio cannot be obtained through a general amplifier. For example, FIG. 1 illustrates an absorption spectrum of water, and as understood from this spectrum, absorbance varies remarkably with the spectral wavelength. In general, the detection intensity of output light from a sample also varies remarkably with the wavelength. When a measuring signal from a detector changes over a wide range, the measuring signal is in a feeble wavelength region in an amplifier keeping its amplification degree constant and the signal may not satisfy resolution when retrieved in a computer through an A-D convertor, resulting in a reduction of measuring resolution.

In order to improve the purity of a spectral wavelength in an acousto-optic device, the incidence of light upon this acousto-optic device must satisfy constant optical conditions. In a conventional spectrophotometer, however, adjustment of a luminous flux incident upon an acousto-optic device from a light source is insufficient, as the rate of zero-order light contained in positive or negative first order diffractive light is large, and it cannot be said that the purity of the spectral wavelength is sufficiently large.

In addition, positive or negative first order diffractive light outgoing from the acousto-optical device is different in direction from the zero-order light but close enough for the zero-order light to be readily mixed into the extracted positive or negative first order diffractive light.

In order to measure a measuring signal where intensity changes over a wide range while keeping resolution, the degree of amplification must be switched. In the case of measuring a spectrum with a large dynamic range (as shown in FIG. 1, for example), it is necessary to switch the degree of amplification, increasing it for a signal with low strength and reducing it for a signal with high strength so that the measured value is not saturated through a semiconductor relay circuit such as a multiplexer. In measurement, pulse noise results from such a switching operation and influences the measured value, causing errors.

In the case of amplifying an extremely feeble signal such as the measuring signal voltage of a noise level slightly larger than the heat noise of a circuit element, for example, the noise is also simultaneously amplified in an amplification method by a feedback amplifier circuit employing a transistor circuit or a differential amplifier circuit employing an operational amplifier, and hence the measuring signal cannot be distinguished from the noise. Thus, what is required is a circuit structure for suppressing the noise resulting from the circuit itself as well as eliminating influence from disturbance in the exterior of the device below the level of the measuring signal.

At least 100,000 are necessary for the signal-to-noise ratio. In a conventional apparatus, however, the signal-to-noise in the FTIR is at a degree not exceeding 10,000.

In order to eliminate influence by noise (random noise) whose frequency band is uniformly distributed, it is necessary to average the measured value by repeatedly performing measurement and integration processing in the measuring wavelength band.

Even if there is more than one measuring wavelength, influence is exerted by long-period fluctuation (drift) of the measuring signal unless the measurement is performed in a short time.

SUMMARY OF THE INVENTION

The first object of the present invention is to make it possible to improve purity of a spectral wavelength in an acousto-optic device and to extract pure first order diffractive light while suppressing the mixture of zero-order light.

The second object of the present invention is to provide a photodetection device which improves measurement accuracy in the case of measuring feeble signals by eliminating the drift component of a measured value.

The third object of the present invention is to provide an optical measuring device which can enable high-speed wavelength scanning by employing an acousto-optic device as a spectroscopic element, improve the purity of a spectral wavelength in the acousto-optic device, and improve measurement accuracy in measuring feeble signals by non-invasively measuring a specific substance in a scattering substance with high accuracy.

The spectroscopic light equipment according to the first aspect of the present invention comprises a light source, an acousto-optic device comprising an acoustic wave transducer on an acousto-optic crystal serving as a spectroscopic element separating light into its spectral components by changing the acoustic wave frequency supplied to the acousto-optic crystal. It also includes a light source optical system to introduce light from the light source into the acousto-optic device in a luminous flux, smaller than the size of a window of the acousto-optic device, as a ray with a propagation angle (degree of parallelism) smaller than the allowable angle of the acousto-optic device. Also incorporated is a condensing optical system condensing zero-order light, positive first order diffractive light and negative first order diffractive light respectively outgoing from the acousto-optic device on positions spatially different from each other, and an irradiation optical system irradiating a target with either the positive or negative first order diffractive light condensed by the condensing optical system.

The photodetection device according to the second aspect of the present invention is adapted to improve measurement accuracy by manipulating the degree of amplification degree in response to the strength of a signal. The photodetection device simultaneously amplifies signal values from a detection element through an amplifier at a plurality of different amplification degrees, A-D converts its outputs, and selects a signal amplified to the maximum with no saturation among the signals, thereby suppressing the occurrence of pulse noise that may have resulted had a switching device such as a relay circuit or a multiplexer been employed. The photodetection device modulates a measuring signal and performs synchronous signal processing corresponding to lock-in processing at its modulation frequency, thereby accurately extracting only a modulation frequency component for eliminating random noise.

To this end, the photodetection device according to the present invention comprises modulation means modulating the measuring light, a detection element outputting a signal responsive to the measuring light, an amplifier inputting the output of the detection element and simultaneously outputting a plurality of signals of different degrees of amplification, an A-D convertor converting the plurality of output signals of different degree of amplification from the amplifier to digital signals, and a data processing part. The data processing part comprises channel selection means inputting the plurality of output signals of the A-D convertor and selecting a non-saturated value of the amplifier or the A-D convertor with the largest degree of amplification from these signals, synchronous signal processing means superposing the selected signal with an oscillation signal synchronous with the modulation frequency modulating the measuring light, and integration means obtaining a measured value by integration of the signal subjected to synchronous signal processing.

The optical measuring device according to the third aspect of the present invention comprises light equipment irradiating a target with light, a photodetection device receiving and detecting output light from the target as measuring light, and a control part controlling operations of the light equipment and the photodetection device. The light equipment, which has been described according to the first aspect of the present invention, modulates the output light of the acousto-optic device by strength modulation of a driving signal for the acoustic wave transducer or mechanical chopping of the light incident upon the acousto-optic device. The photodetection device has been described according to the second aspect of the present invention.

The term "propagation angle" indicates an angle formed by an optical axis of the luminous flux and the propagation direction of the ray in the luminous flux propagated in space. When the optical axis of the luminous flux is perpendicularly introduced into the acousto-optic device, only a ray with a propagation angle smaller than the allowable angle of the acousto-optic device contributes to first order diffractive light. Therefore, the intensity of the first order diffractive light is increased as the number of rays with propagation angles smaller than the allowable angle of the acousto-optic device is increased in the luminous flux perpendicularly entering the acousto-optic device. Preferably, the propagation angles of all rays entering the acousto-optic device should be smaller than the allowable angle of the acousto-optic device.

While the optical axis of the luminous flux entering the acousto-optic device is preferably perpendicular to an incidence plane of the acousto-optic device, the direction of the optical axis of the luminous flux entering the acousto-optic device may not be strictly perpendicular to the incidence plane of the acousto-optic device if satisfying the condition that an angle formed by the ray included in the luminous flux and the perpendicular direction with respect to the incidence plane of the acousto-optic device is smaller than the allowable range of the acousto-optic device.

The light source optical system is adjusted to introduce the light from the light source into the acousto-optic device in the luminous flux which is smaller than the size of the window of the acousto-optic device as the ray with a propagation angle smaller than the allowable angle of the acousto-optic device, whereby the purity of the first order diffractive light is improved and its intensity increased. Furthermore, the mixture of the zero-order light into the first order diffractive light can be suppressed by condensing the zero-order light, the positive first order diffractive light and the negative first order diffractive light respectively on positions spatially different from each other. Consequently, light of a desired wavelength can be accurately extracted from the light source.

Wavelength scanning can be performed at a high speed by changing the acoustic wave frequency supplied by the acoustic wave transducer to the acousto-optic crystal to separate the light into its spectral components. Consequently, the measuring time can be shortened, and any drift of the light quantity in the measuring time etc. can be suppressed.

The output light from the acousto-optic device can be modulated by strength modulation of the driving signal for the acoustic wave transducer or mechanical chopping of the light entering the acousto-optic device. Modulation synchronous detection (wave detection) enables detection of a light signal by the strength modulation. Therefore, in order to eliminate random noise, the output light from the acousto-optic device is modulated, modulating the measuring signal, and the synchronous signal processing corresponding to lock-in processing is performed at the modulation frequency, where only a modulation frequency component can be accurately extracted.

Measurement accuracy can be improved by manipulating the degree of amplification in response to the strength of the signal. At this time, the occurrence of pulse noise, which may have been caused had a switching device such as a relay circuit or a multiplexer been employed, can be suppressed by simultaneously amplifying the signal values from the detection element by the amplifier at a plurality of different degrees of amplification, A-D converting its outputs and selecting a signal amplified to the maximum with no saturation from the signals.

In the optical measuring device according to the present invention, the light source irradiating the target increases the purity of the positive first order diffractive light and the negative first order diffractive light outgoing from the acousto-optic device and performs spectral separation and modulation of the output light. While the detection side detecting the output light from the target performs the synchronous signal processing corresponding to lock-in processing at the modulation frequency of the measuring light for accurately extracting only the modulation frequency component, it simultaneously amplifies the detection signals at a plurality of different degrees of amplification and selects a signal amplified to the maximum with no saturation from these signals, thereby suppressing pulse noise. Thus, a specific substance in a scattering substance can be noninvasively measured with high accuracy.

An exemplary optical system adjusting the light from the light source to be incident upon the acousto-optic device as a luminous flux smaller than the size of the window of the acousto-optic device and a ray with a propagation angle smaller than the allowable angle of the acousto-optic device is a premirror arranged on a front portion on the optical axis of the light source to reflect the light from the light source toward the acousto-optic device and an optical system bringing a specular surface of the premirror into a conjugate relation with the incidence plane of the acousto-optic device. If the size of the window of the acousto-optic device is small, a mask is provided to reduce the luminous flux.

A postmirror arranged on a back portion of the optical axis of the light source to reflect the light from the light source toward the premirror can be further provided. Thus, the utilization efficiency of light source energy to incidence upon the acousto-optic device from the light source is improved.

A preferable example of the irradiation optical system is an optical system composed of positive first order diffractive light and negative first order diffractive light condensed by the condensing optical system on the same optical axis and irradiating the target. Thus, the utilization efficiency of the light source energy is improved by utilizing both the positive first order diffractive light and the negative first order diffractive light.

A preferable example of the irradiation optical system composing the positive first order diffractive light and the negative first order diffractive light on the same optical axis is a branched optical fiber member with at least two branched first end portions and a single joined second end portion. The positive first order diffractive light and the negative first order diffractive light condensed by the condensing optical system are respectively introduced into the branched end portions of the branched optical fiber member, so that the target is irradiated with light outgoing from the joined second end portion. At this time, the end portion receiving the positive or negative first order diffractive light in the irradiation optical system is preferably set on a focal plane of the condensing optical system.

A more preferable example of the irradiation optical system composing the positive first order diffractive light and the negative first order diffractive light on the same optical axis is a branched optical fiber member with three branched first end portions and a single joined second end portion. The positive first order diffractive light and the negative first order diffractive light condensed by the condensing optical system are respectively introduced into two of the three branched first end portions of the branched optical fiber member, while the output light by the target light of outgoing light from the joined second end portion is introduced into the second end portion, and guided to the photodetection device by the remaining branched first end portion. The structure is simplified by employing such a branched optical fiber member.

A plurality of acousto-optic devices with different spectral wavelength regions may be serially arranged on an optical path of the light source optical system, so that any of the acousto-optic devices can be selected and driven. Thus, usable wavelength ranges are widened.

In order to obtain more stable output results, it is preferable to receive the zero-order light in the output light from the acousto-optic device or light source light from a lamp source so that any fluctuation in the intensity of the light source may be corrected.

A preferable example of the amplifier simultaneously outputting a plurality of signals of different degrees of amplification is one comprising an input buffer circuit inputting a modulated output of the detection element, a voltage-to-current conversion circuit converting output voltage fluctuation of the input buffer circuit to current fluctuation by a resistive element, a current-to-voltage conversion circuit converting the current fluctuation by the voltage-to-current conversion circuit to voltage fluctuation amplified in a prescribed magnification by means of a resistive element, and an amplifier circuit inputting a voltage fluctuation output of the current-to-voltage conversion circuit through an output buffer circuit and outputting a plurality of signals of different magnifications. The voltage-to-current conversion circuit and the current-to-voltage conversion circuit form a preamplifier, while the amplifier circuit outputting a plurality of signals of different magnifications forms a amplifier. The amplification degrees are decided by a combination of amplifying the signals in voltage-to-current conversion in the preamplifier and further amplifying the signals at the time of current-to-voltage conversion. The signals of the preamplifier can be simultaneously outputted from the amplifier at different degrees of amplification.

The data processing part preferably further comprises low-pass filter means eliminating a high-frequency component unnecessary for the synchronous signal processing from the signal selected by the channel selection means and data skip means regarding a value extracted from a signal train passed through the low-pass filter means at a constant interval every unit number as a signal value between the channel selection means and the synchronous signal processing means. Data measured at a high sampling frequency has a large Nyquist bandwidth, and hence characteristics of a low-pass filter for preventing aliasing noise can be loosened. When skip processing is performed to enable processing with a small data quantity, apparent sampling frequency is reduced by the skip processing and hence superposition results in frequency spectra of measured values. Influence by noise can be eliminated by performing processing through the low-pass filter before performing skip processing.

Bandpass filter processing with a passband in the vicinity of the modulation frequency is preferably performed before the synchronous signal processing is carried out.

The frequency of the signal may be displaced from the modulation frequency before performing the synchronous signal processing, and hence the accuracy of the synchronous signal processing can be improved by correcting such displacement. Thus, the optical measuring device preferably further comprises frequency displacement correction means measuring frequency displacement between the frequency of the signal inputted in the synchronous signal processing means and the modulation frequency generated with reference to a clock signal of a computer and correcting the synchronizing frequency of the synchronous signal processing means on the basis of results obtained.

The signal modulated by the synchronous signal processing reaches a constant value (direct current component), and hence a high-frequency component is preferably eliminated by a low-pass filter. Therefore, the optical measuring device preferably further comprises low-pass filter means eliminating the high-frequency component unnecessary for the synchronous signal processing between the synchronous signal processing means and the integration means.

Digital integration processing is higher in accuracy as the time constant for integration is increased. Therefore, the calculation speed can be improved by previously converging the calculation at a value close to the true value with a small time constant and then converging the value as an initial value with a large time constant.

In the case of generating a plurality of outputs of different degrees of amplification from the amplifier, errors result in magnifications between amplifiers with different degrees of amplification. For example, an output at a x 100 degree of amplification is not necessarily correctly five times that at a x 20 degree of amplification. Instrumental errors between signals with different degrees of amplification can be eliminated by inputting a constant signal and outputting signals of different degrees of amplification, taking ratios to a certain reference output signal, regarding same as correction data and using this to correct errors between the respective degrees of amplification during the performance of digital processing. Thus, the optical measuring device preferably further comprises instrumental error preservation means comparing a plurality of outputs of different degrees of amplification of the amplifier receiving a signal of a constant amplitude and preserving the results as instrumental errors between outputs of different degrees of amplification and amplifier output correction means correcting the outputs of the amplifier with the instrumental errors preserved in the instrumental error preservation means.

When the power supply voltage of the amplifier is measured by a measuring instrument for making corrections by taking a ratio to a previously set reference voltage, displacement of the absolute value of the measured value can be corrected. Thus, the optical measuring device preferably further comprises measurement result correction means measuring the power supply voltage of the amplifier and correcting the measurement result by a ratio to a previously set reference voltage.

In the case of simultaneously measuring the measuring light and reference light (zero-order light from the acousto-optic device or light source light), the present invention is preferably so structured that the detection element and the amplifier are provided for both measuring light detection and reference light detection, the A-D convertor is adapted to convert both a measuring light detection signal and a reference light detection signal to digital signals, while the data processing part performs similar data processing for the reference light detection signal, dividing and correcting the data processing result of the measuring light detection signal by that of the reference light detection signal.

The aforementioned and other objects, features, aspects and advantages of the present invention will become more apparent from the following detailed description when seen in conjunction with the accompanying drawings.

BRIEF DESCRIPTION OF THE DRAWINGS

FIGS. 6A to 6D are respectively a schematic front sectional view showing an exemplary branched optical fiber member employed in the irradiation optical system in the embodiment of the piece of spectroscopic light equipment, an end view showing branched end portions thereof, an end view showing a joined end portion, and a schematic diagram showing its operation;

FIG. 9 illustrates a spectrum measured by employing the embodiment of the measuring device shown in FIG. 8A and introducing only negative first order diffractive light;

DESCRIPTION OF THE PREFERRED EMBODIMENTS

Figure 1:
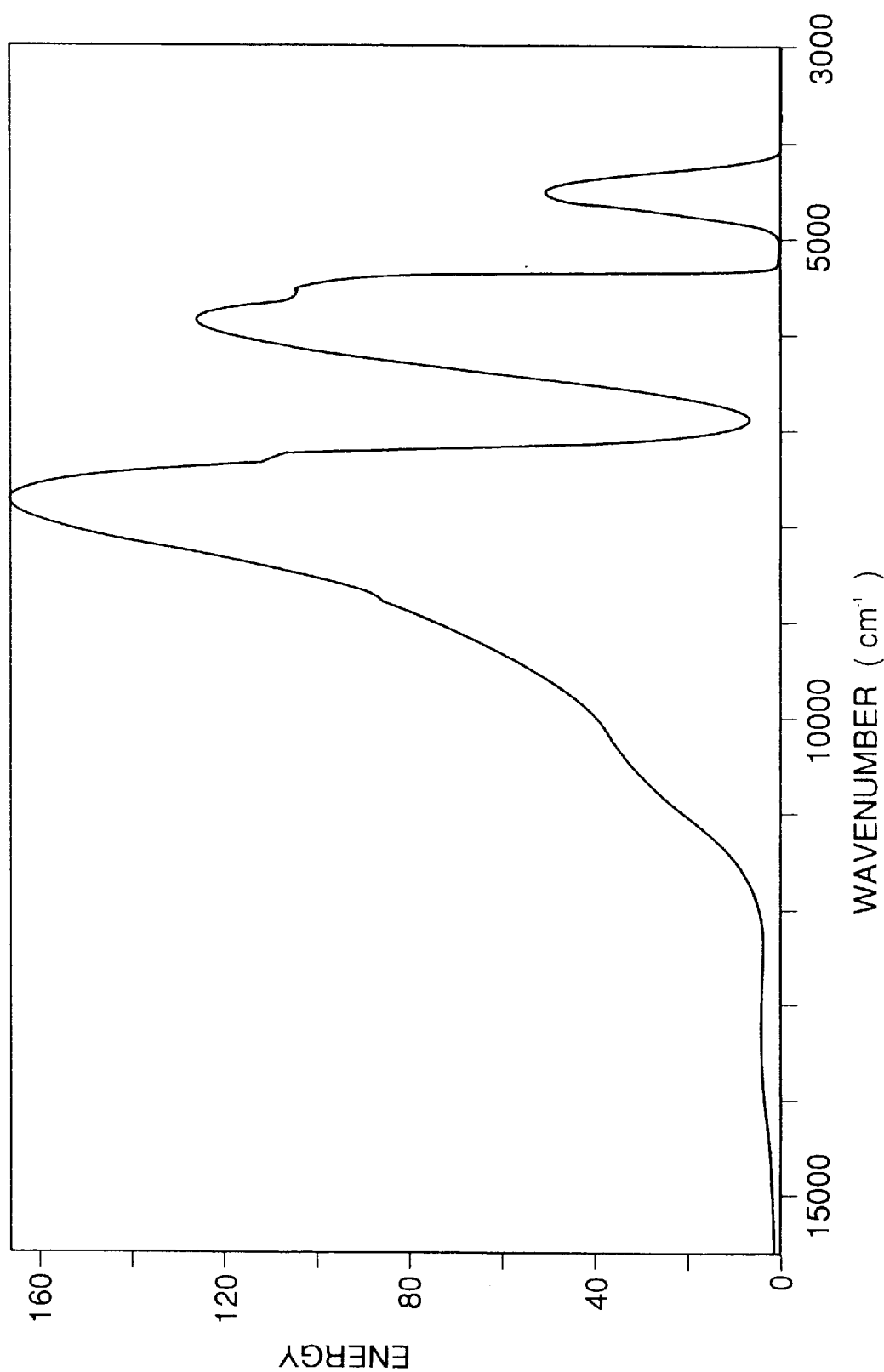
FIG. 1 illustrates an absorption spectrum of water by an FTIR.
Figure 2:
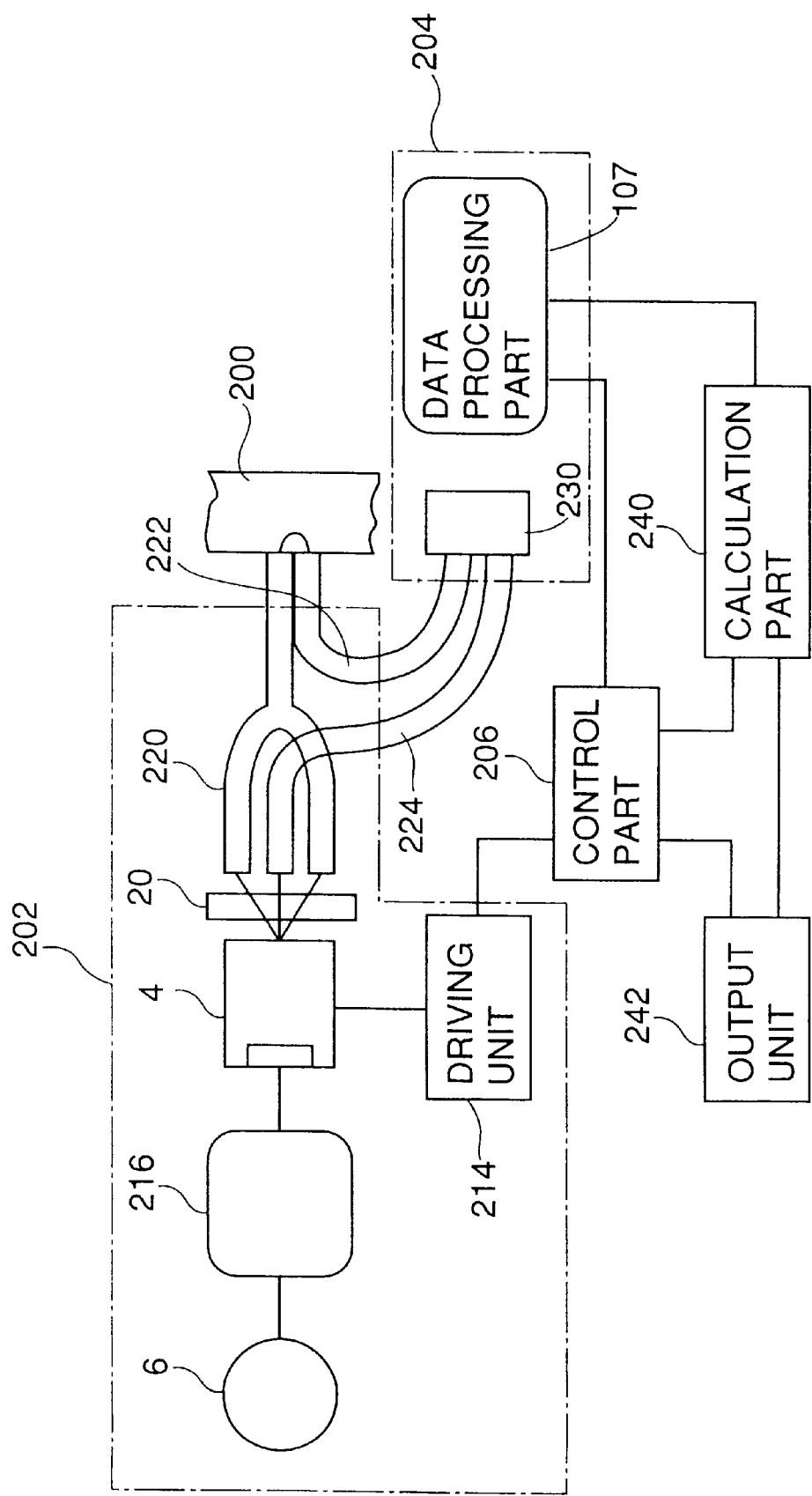
FIG. 2 is a block diagram schematically showing one embodiment of an optical measuring device according to the present invention.

FIG. 2 schematically illustrates an optical measuring device according to one embodiment of the present invention, which comprises light equipment 202 irradiating a target 200 with light, a photodetection device 204 receiving and detecting output light (transmitted/scattered light) by the target 200 as measuring light, and a control part 206 controlling the operations of the light equipment 202 and the photodetection device 204.

The light equipment 202 is a piece of spectroscopic light equipment, which comprises a light source 6, an acousto-optic device 4 comprising an acoustic wave transducer on an acousto-optic crystal serving as a spectroscopic element, an acousto-optic device driving unit 214 separating light into its spectral components by changing the acoustic wave frequency supplied from the acoustic wave transducer to the acousto-optic crystal and modulating output light from the acousto-optic device 4 by strength modulation of a driving signal for the acoustic wave transducer, a light source optical system 216 perpendicularly introducing the light from light source 6 in a luminous flux, smaller than the size of a window of acousto-optic device 4, of a ray having a propagation angle smaller than the allowable angle of acousto-optic device 4 into acousto-optic device 4, a condensing optical system 20 condensing zero-order light, positive first order diffractive light and negative first order diffractive light outgoing from acousto-optic device 4 on positions spatially different from each other, and irradiation optical system 220 irradiating target 200 with either the positive or negative first order diffractive light condensed by condensing optical system 20.

Photodetection device 204 comprises photoreceiving part 230 and data processing part 107. Photoreceiving part 230 comprises a detection element outputting a signal responsive to the modulated measuring light, an amplifier inputting an output of the detection element and simultaneously outputting a plurality of signals of different degrees of amplification, and an A-D convertor converting the plurality of output signals of different degrees of amplification from the amplifier to digital signals. Data processing part 107 comprises channel selection means inputting the plurality of output signals from the A-D convertor and selecting a non-saturated value of the amplifier or the A-D convertor while maintaining the largest degree of amplification from these signals, synchronous signal processing means superposing the selected signal with an oscillation signal synchronous with the modulation frequency modulating the measuring light, and integration means obtaining a measured value by integrating the signal subjected to synchronous signal processing.

Irradiation optical system 220 is a branched optical fiber member with first end portions branched into two and a joined second end portion. The positive first order diffractive light and the negative first order diffractive light condensed by condensing optical system 20 enter the branched first end portions of this branched optical fiber member so that target 200 is irradiated with light outgoing from the joined second end portion. Optical fiber member 222 guides the output light from target 200 to photoreceiving part 230.

Both the optical fiber members forming irradiation optical system 220 and optical fiber member 222 for receiving the output light are preferably branched optical fiber member with a single end portion facing target 200 and three branched other end portions. In this case, the positive first order diffractive light and the negative first order diffractive light are introduced into two of the three branched end portions while the remaining one end portion of the three branched end portions can be guided to photoreceiving part 230, simplifying the structure.

In order to receive the zero-order light from acousto-optic device 4, correct fluctuation of light source intensity and also obtain a stable output result, optical fiber member 224 guides the zero-order light condensed by condensing optical system 20 to photoreceiving part 230.

Numeral 240 denotes a calculation part calculating the concentration of a target object in target 200 from the measured value obtained in data processing part 107, and numeral 242 denotes an output unit such as a printer, a recorder or a CRT outputting the result of measurement.

The acousto-optic crystal of acousto-optic device 4 is prepared from tellurium dioxide ($TeO_2$), and the acoustic wave transducer is stuck to one side. A wavelength is selected in the range of 800 to 2400 nm by a frequency supplied from the acoustic wave transducer to the crystal, and scanned. The output light of acousto-optic device 4 is modulated by strength modulation of the driving signal for the acoustic wave transducer. Control part 206 controls the acousto-optic device driving unit 214, for performing such wavelength scanning and modulation.

When a prescribed acoustic wave frequency is supplied from the transducer of acousto-optic device 4, diffracted light responsive to this frequency outgoes separately as positive first order diffractive light and negative first order diffractive light, and the remaining wavelength light is transmitted as zero-order light. The positive first order diffractive light and the negative first order diffractive light are composed on the same optical axis by irradiation optical system 220, to be applied to target 200. The zero-order light is not applied to target 200 but as it expresses the light source intensity is utilized for correction of measuring light.

FIGS. 3 to 6B shows a concrete example of light equipment 202 in the embodiment.

Figure 3:
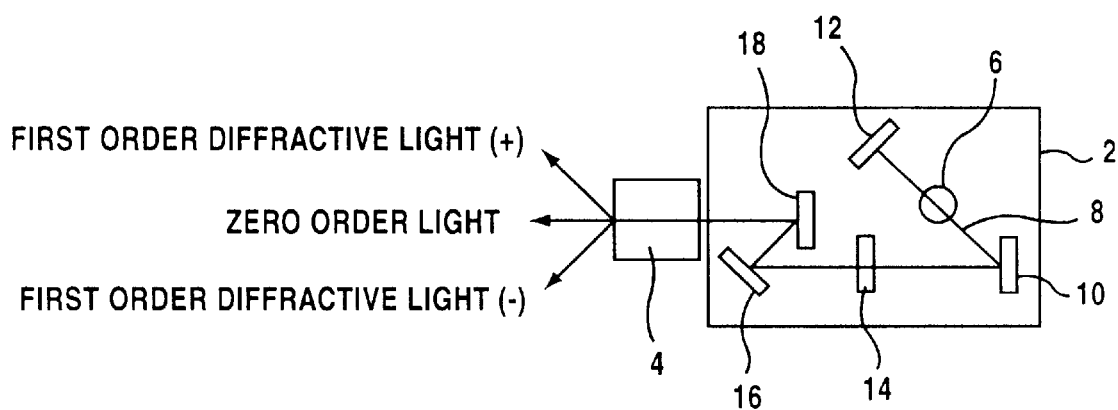
FIG. 3 is a schematic plan view showing a light source chamber and an acousto-optic device in one embodiment of a piece of spectroscopic light equipment according to the present invention.
Figure 4:
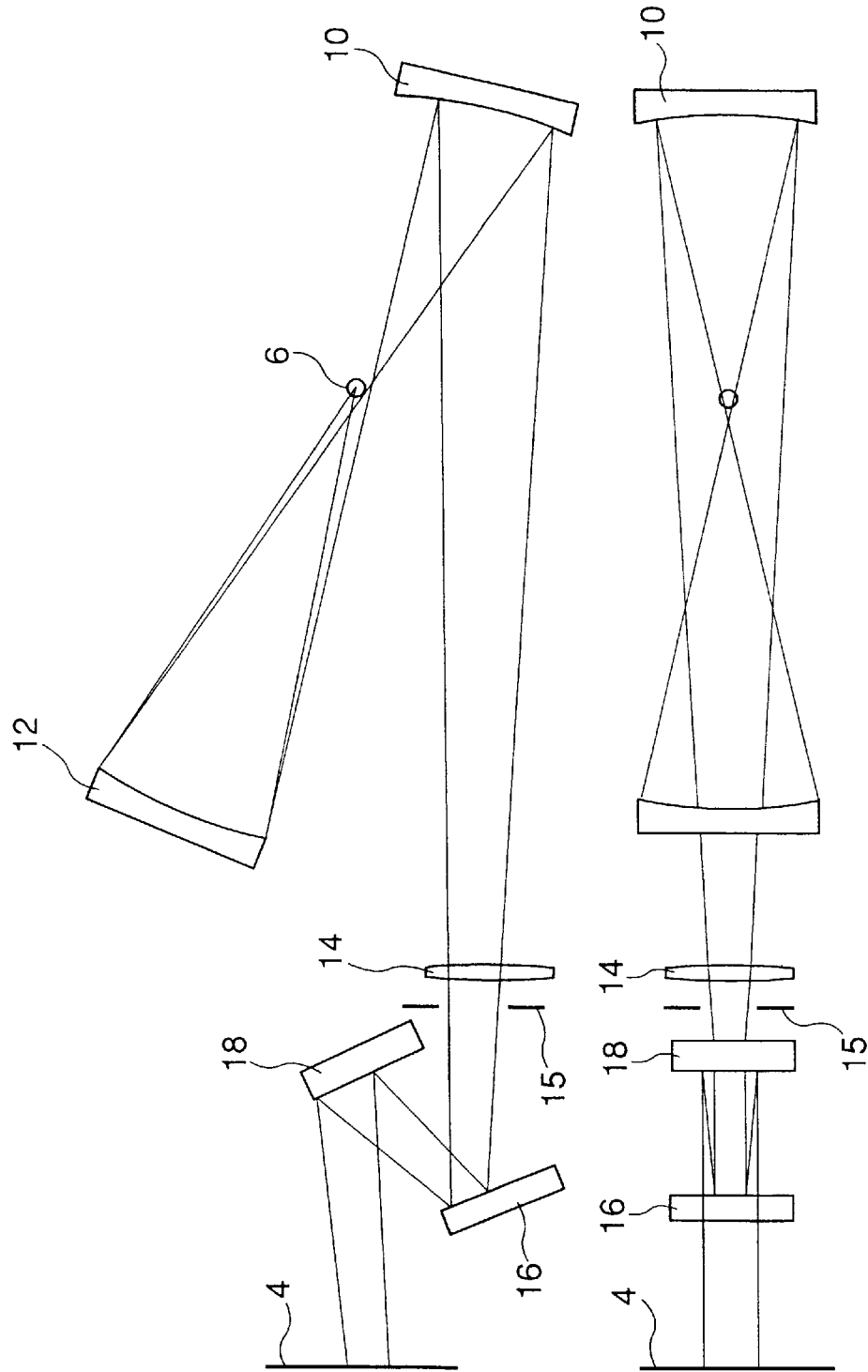
FIGS. 4A and 4B are a plan view and a front elevational view showing an optical system in the light source chamber of the embodiment of the piece of spectroscopic light equipment according to the present invention.

FIG. 3 shows light source chamber 2 and acousto-optic device 4 separating continuous wavelength light from light source chamber 2 into its spectral components. Light source 2 is provided with a halogen lamp serving as light source 6, and light source optical system 216 collecting light from light source 6 and introducing same into acousto-optic device 4 substantially as parallel light. Premirror 10 and postmirror 12 are respectively arranged in front and behind light source 6 on optical axis 8. Lens 14 and mirrors 16 and 18 are arranged on an optical path between premirror 10 and acousto-optic device 4 for converting the light from light source 6 collected by premirror 10 and postmirror 12 to parallel light, so that the light source light is introduced into acousto-optic device 4 through these optical systems.

FIGS. 4A and 4B illustrate the optical system in light source chamber 2 in detail. Premirror 10 and postmirror 12 are spherical mirrors with the same focal length. The distance between a filament of light source 6 and post mirror 12 is set to be substantially twice the focal length, while the direction of optical axis of post mirror 12 is so set that a filament image of light source 6 formed by postmirror 12 is slightly displaced from the filament itself. Such design is adapted to improve utilization efficiency of light source energy.

The light from light source 6 is primarily imaged at the back of convex lens 14 by premirror 10 and convex lens 14. Mask 15, limiting the luminous flux, can be arranged on this position as required. Spherical mirror 18 secondarily images the primarily formed light image on an incidence plane of acousto-optic device 4. Mirror 16 is a plane mirror merely bending the optical path. The optical system including premirror 10, postmirror 12, lens 14 and mirrors 16 and 18 perpendicularly introduces the light source light into acousto-optic device 4 as parallel light with respect to its incidence plane. The acousto-optic crystal of acousto-optic device 4 decides allowable values of a propagation angle and a spot diameter of the luminous flux secondarily imaged and introduced into acousto-optic device 4. For example, allowable value for the propagation angle is about 6°, and that for the spot diameter is not more than 10 mm. The radii of curvatures of mirrors 10, 12 and 18, the focal length of lens 14, and the sizes, positions and angles thereof are so set that the propagation angle and the spot diameter of the luminous flux entering acousto-optic device 4 are within the ranges of the tolerance decided by acousto-optic device 4.

If the allowable value for the propagation angle is, for example, the optical system is so adjusted that propagation angles of all rays in the luminous flux perpendicularly introduced into the incidence plane of the acousto-optic device 4 are within the range of 0 to ±6°.

If the spot diameter of light introduced into acousto-optic device 4 exceeds the allowable value, mask 15 is provided to limit this.

Premirror 10 and postmirror 12 are not restricted to spherical mirrors, but may, for example, be formed alternatively by parabolic mirrors. Mirrors 10 and 12 can be designed in response to the allowable ranges for the degree of parallelism and the spot diameter of the light incident upon acousto-optic device 4.

Figure 5:
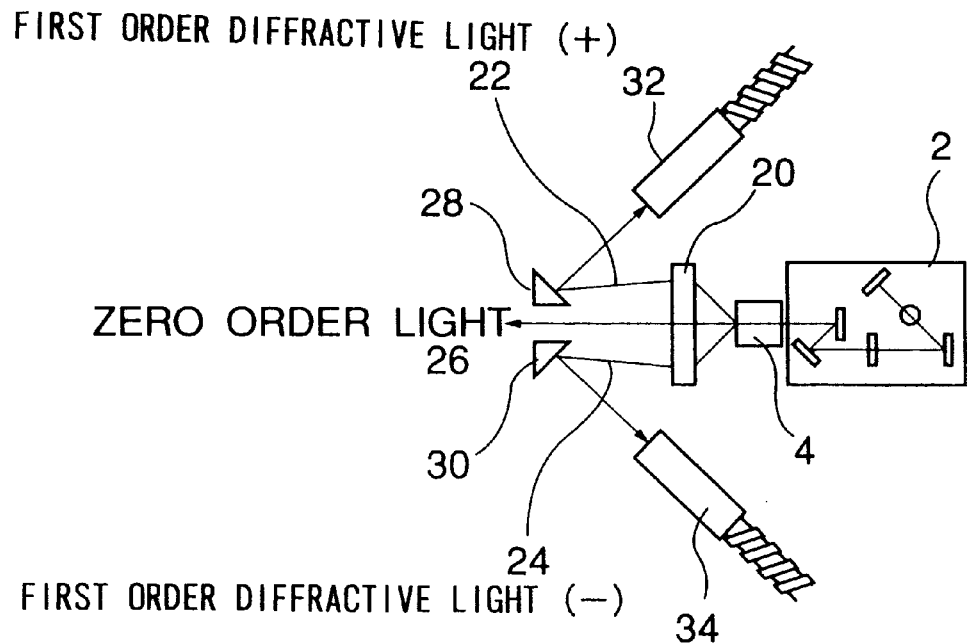
FIG. 5 is schematic plan view showing the light source chamber, the acousto-optic device and an irradiation optical system in the embodiment of the piece of spectroscopic light equipment according to the invention.

FIG. 5 illustrates an example of irradiation optical system 220. Light source chamber 2 and acousto-optical device 4 are those shown in FIG. 3. Lens 20 serving as the condensing optical system respectively condenses zero-order light 26, positive first order diffractive light 22 and negative first order diffractive light 24 from acousto-optic device 4. Positive first order diffractive light 22, negative first order diffractive light 24 and zero-order light 26 have different optical axes, and prisms 28 and 30 are arranged on optical paths of positive first order diffractive light 22 and negative first order diffractive light 24 in order to change the directions of the optical paths, while branched end portions 32 and 34 of a branched optical fiber member are arranged on the optical paths as incidence ends. Zero-order light 26, positive first order diffractive light 22 and negative first order diffractive light 24 generated from acousto-optic device 4, each of which is substantially parallel light, are condensed on a focal plane of lens 20. Branched end portions 32 and 34 of the branched optical fiber member are respectively arranged on the focal plane of lens 20. The optical paths of positive first order diffractive light 22 and negative first order diffractive light 24 are bent by prisms 28 and 30 respectively so that the spatial positions thereof are separated from each other, and branched end portions 32 and 34 of the branched optical fiber member of irradiation optical system 220 are respectively arranged on the bent optical paths. Positive first order diffractive light 22 and negative first order diffractive light 24 entering branched end portions 32 and 34 of the branched optical fiber member are composed on the same optical axis on yet another end of the branched optical fiber member and then applied to target 200.

Positive first order diffractive light 22, negative first order diffractive light 24 and zero-order light 26 approach each other spatially although their optical axes differ, and hence prisms 28 and 30 are employed to change the optical paths of positive first order diffractive light 22 and negative first order diffractive light 24, thereby inhibiting zero-order light 26 from being mixed into the respective optical paths. Prisms 28 and 30 may be replaced with mirrors to change the optical paths of positive first order diffractive light 22 and negative first order diffractive light 24.

FIG. 6A illustrates an exemplary branched optical fiber member employed in irradiation optical system 220. FIGS. 6B and 6C are end views showing branched end portions and a joined end portion of the branched optical fiber member respectively. This branched optical fiber member has three branched first end portions 32, 34 and 36 and a single joined second end portion 38. The optical fiber member employed herein is prepared from a core material of $GeO_2$-containing $SiO_2$ with a core diameter of 127±7 μm and a clad material of fluorine-containing $SiO_2$ with a clad diameter of 140±5 μm. The primary coating material for each single-core optical fiber member is prepared from silicone resin, and the primary coated body has a diameter of 165±5 μm, and a numerical aperture NA is 0.35. Such optical fiber members are bundled into bundled fiber members on branched end portions 32, 34 and 36, and each bundle fiber member has a diameter of 5 mm, while the coating material for the bundle fiber member has an outer diameter of 12 mm. The filling factor of the optical fiber members in the bundle fiber members is about 90%.

The bundle fiber member diameter on joined second end portion 38 is 8.7 mm, and the outer diameter of the coating material is 19 mm.

FIG. 6D is a model diagram of same, and the optical fiber members of the three branched bundled optical fiber members are gathered at random on joined end portion 38. Positive first order diffractive light 22 and negative first order diffractive light 24 respectively entering branched end portions 32 and 34 are joined on joined end portion 38. Remaining branched end portion 36 is employed to guide the output light from target 200 to a detector.

Figure 7:
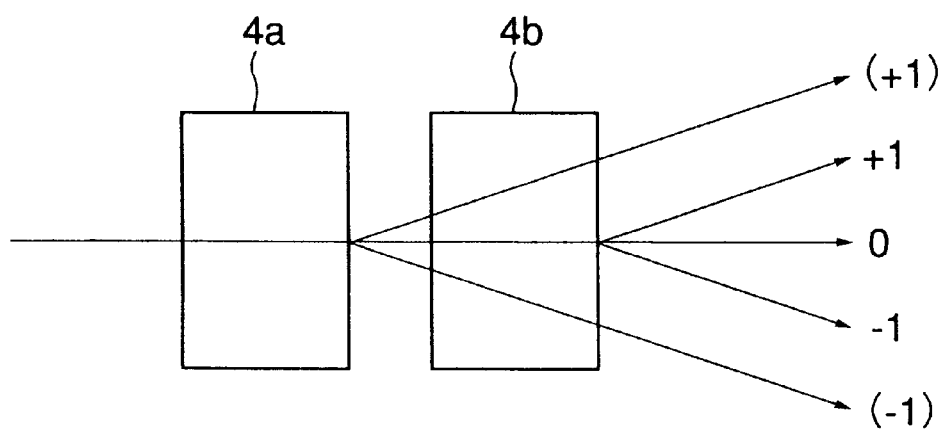
FIG. 7 is a schematic plan view showing an acoustic optical device in another embodiment of the spectroscopic light equipment according to the present invention.

FIG. 7 illustrates another example of the acousto-optic device.

Two acousto-optic devices 4a and 4b with the optical characteristics of a spectral wavelength region for measurement are serially arranged on an optical path of a light source optical system, so that either one can be selected and driven. Acousto-optic crystals which are diffracted in different wavelength regions are selected and used for acousto-optic devices 4a and 4b. Assuming for example, that acousto-optic device 4a emits diffracted light of a near-infrared region and that acousto-optic device 4b emits diffracted light of a visible region, the infrared or visible region can be selected by driving one of acousto-optic devices 4a or 4b. Wavelengths covering a wide wavelength area from the infrared to visible regions can be selected by selecting acoustic wave frequencies from transducers in the respective wavelength regions.

Each of zero-order light, positive first order diffractive light and negative first order diffractive light of diffracted light generated from each of acousto-optic devices 4a and 4b is substantially parallel light, and hence the diffracted light from acousto-optic device 4a and that from acousto-optic device 4b can be condensed on the focal plane of a common condensing lens by arranging the common condensing lens thereon. When branched end portions of a branched optical fiber member such as that shown in FIG. 5 are arranged on the focal plane, the diffracted light from acousto-optic device 4a as well as that from acousto-optic device 4b can be introduced into the same branched optical fiber member.

Figure 8A:
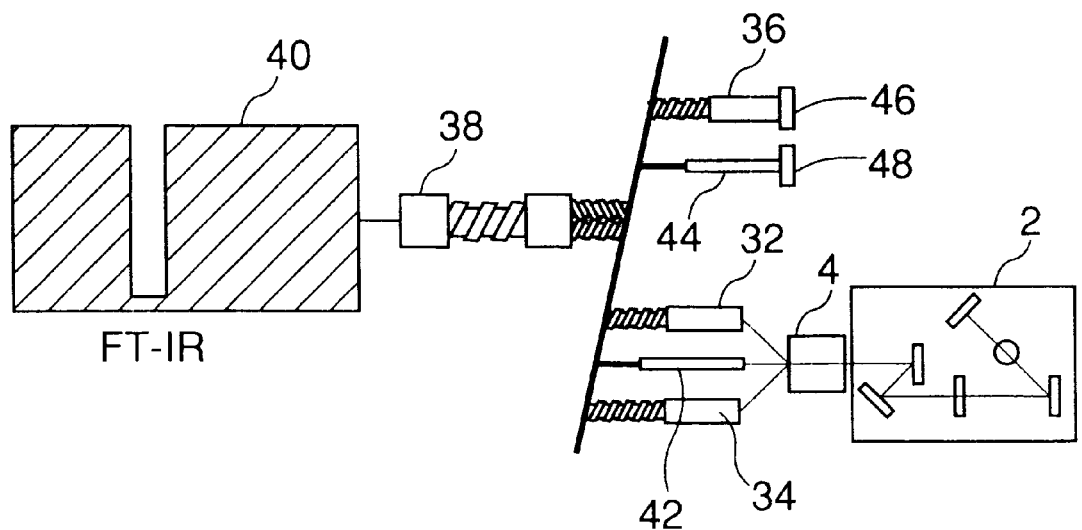
FIGS. 8A and 8B are arrangement diagrams showing an optical system for characteristic measurement in one embodiment of an optical measuring device according to the present invention and that in a conventional AOTF which is a spectrophotometer.
Figure 8B:
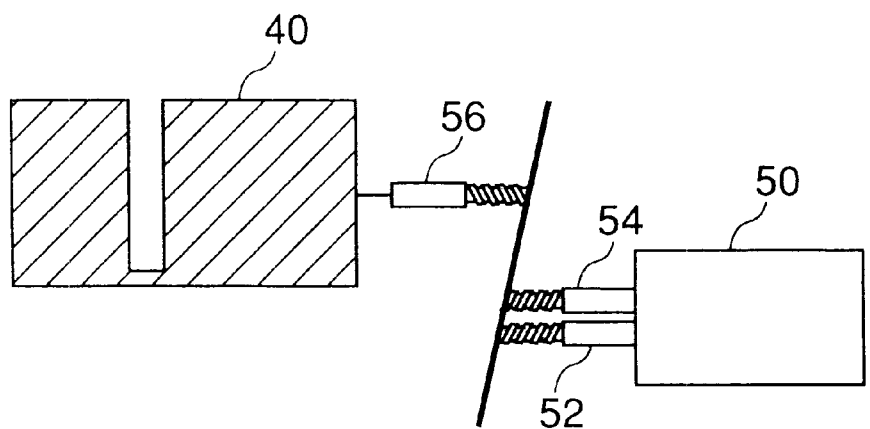

FIGS. 8A and 8B show measuring systems for comparing characteristics of an embodiment and a conventional spectrophotometer serving as light sources.

FIG. 8A shows the arrangement of one embodiment, in which positive first order diffractive light and negative first order diffractive light from acousto-optic device 4 enter the respective incidence ends 32 and 34 of a branched optical fiber member, and further enter FTIR 40 from joined end 38 to be separated into spectral components thereof. The light separated into the spectral components in FTIR 40 is detected by a detector (indium antimonide: InSb) contained in FTIR 40 in this measurement. On the other hand, zero-order light enters end 42 of another optical fiber member, and enters PbS element 48 from another end 44 of this optical fiber member, to be detected as monitor light monitoring the fluctuation in the intensity of the light source.

Only one or other of either the positive or negative first order diffractive light from acousto-optic device 4 may be used, and the remaining one may be blocked.

On the other hand, the conventional spectrophotometer shown in FIG. 8B has a photodetection device inside it. Outgoing light from a spectroscopic part (body) 50 enters a branched end 52 of a branched optical fiber member and further enters FTIR 40 from joined end 56, to be separated into its spectral components. The light separated into its spectral components in FTIR 40 is detected by a detector contained in FTIR 40, so that its light intensity is detected in this measurement.

FIG. 9 illustrates an initial spectrum by one embodiment, which is obtained by performing wavelength scanning by changing the acoustic frequency of acousto-optic device 4 in the measuring system shown in FIG. 8A, introducing the negative first order diffractive light into incidence end 34 while blocking diffracted light from entering the other incidence end 32. The vertical axis of FIG. 9 shows energy.

Figure 10:
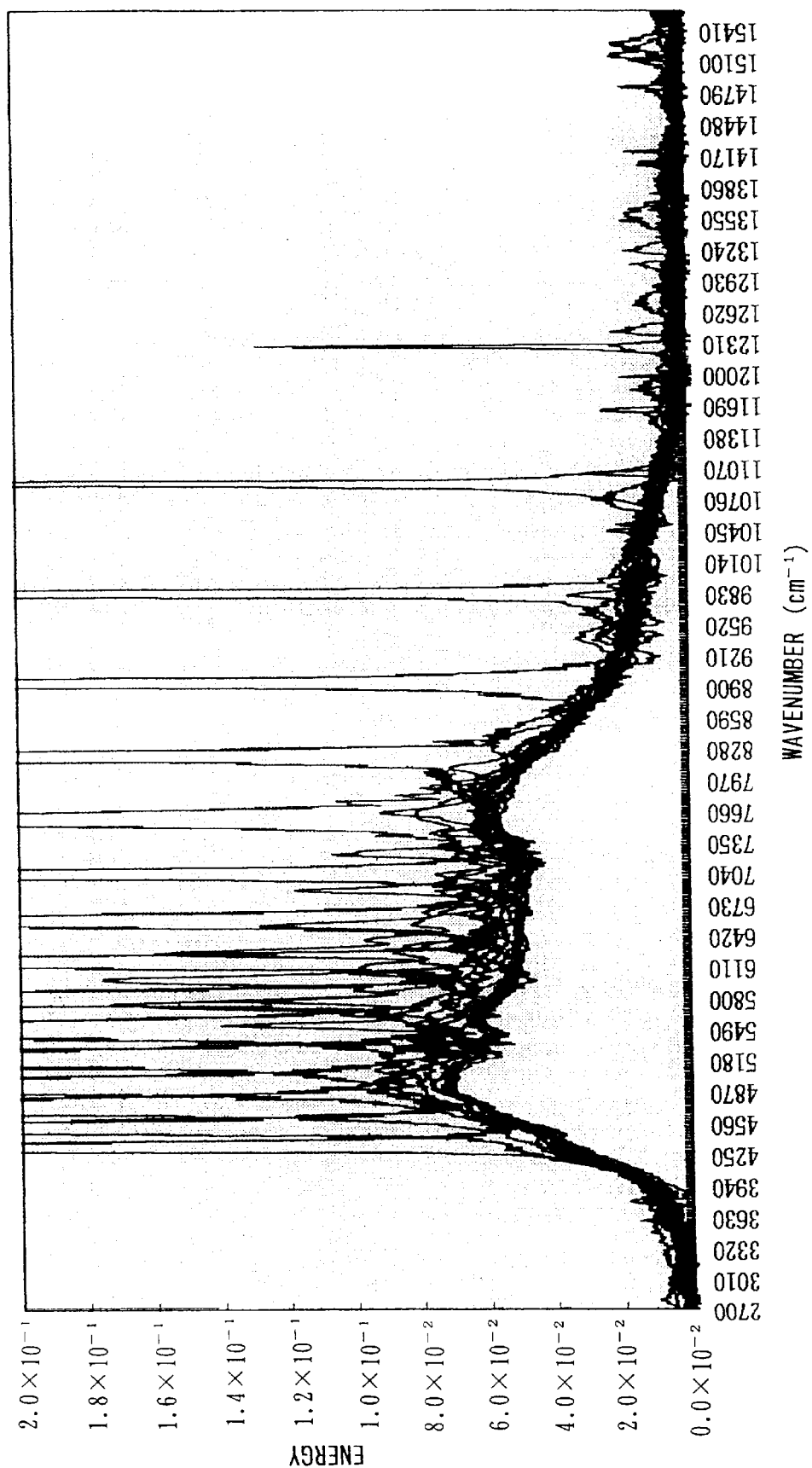
FIG. 10 shows the spectrum of FIG. 9 with improved photosensitivity on the vertical axis.

FIG. 10 illustrates the spectrum of FIG. 9 with improved photosensitivity on the vertical axis. What appears as a continuous spectrum on a lower portion is a zero-order light component.

Figure 11:
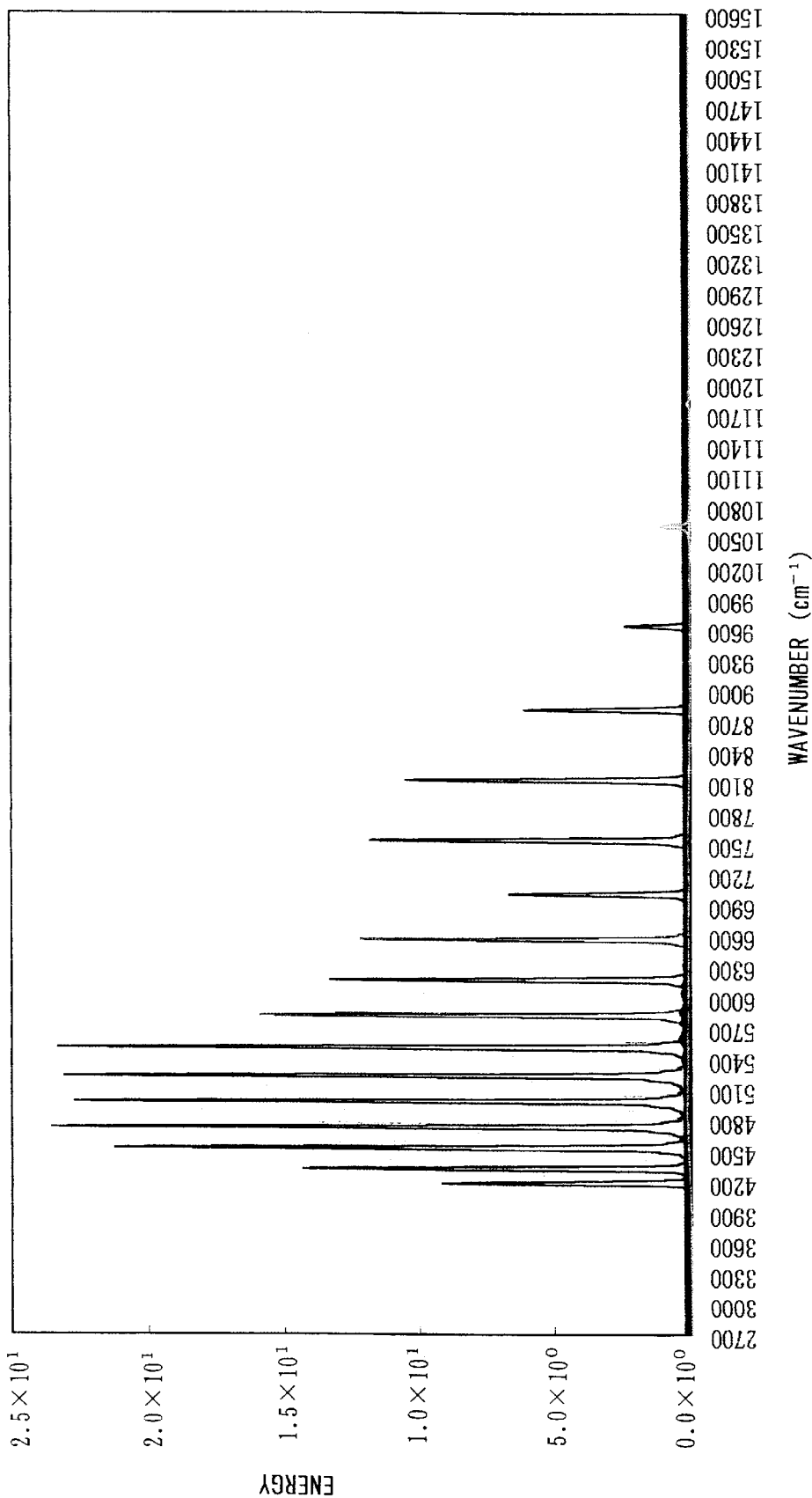
FIG. 11 illustrates a spectrum measured by employing the embodiment of the measuring device shown in FIG. 8A and introducing both negative first order diffractive light and positive first order diffractive light.

FIG. 11 shows a second spectrum of one embodiment, obtained in the measuring system of FIG. 8A by introducing both the positive first order diffractive light and the negative first order diffractive light. As compared with the spectrum shown in FIG. 9, it is understood that the energy intensity is increased. In principle, the spectral intensity in FIG. 11 is about twice that in FIG. 9.

Figure 12:
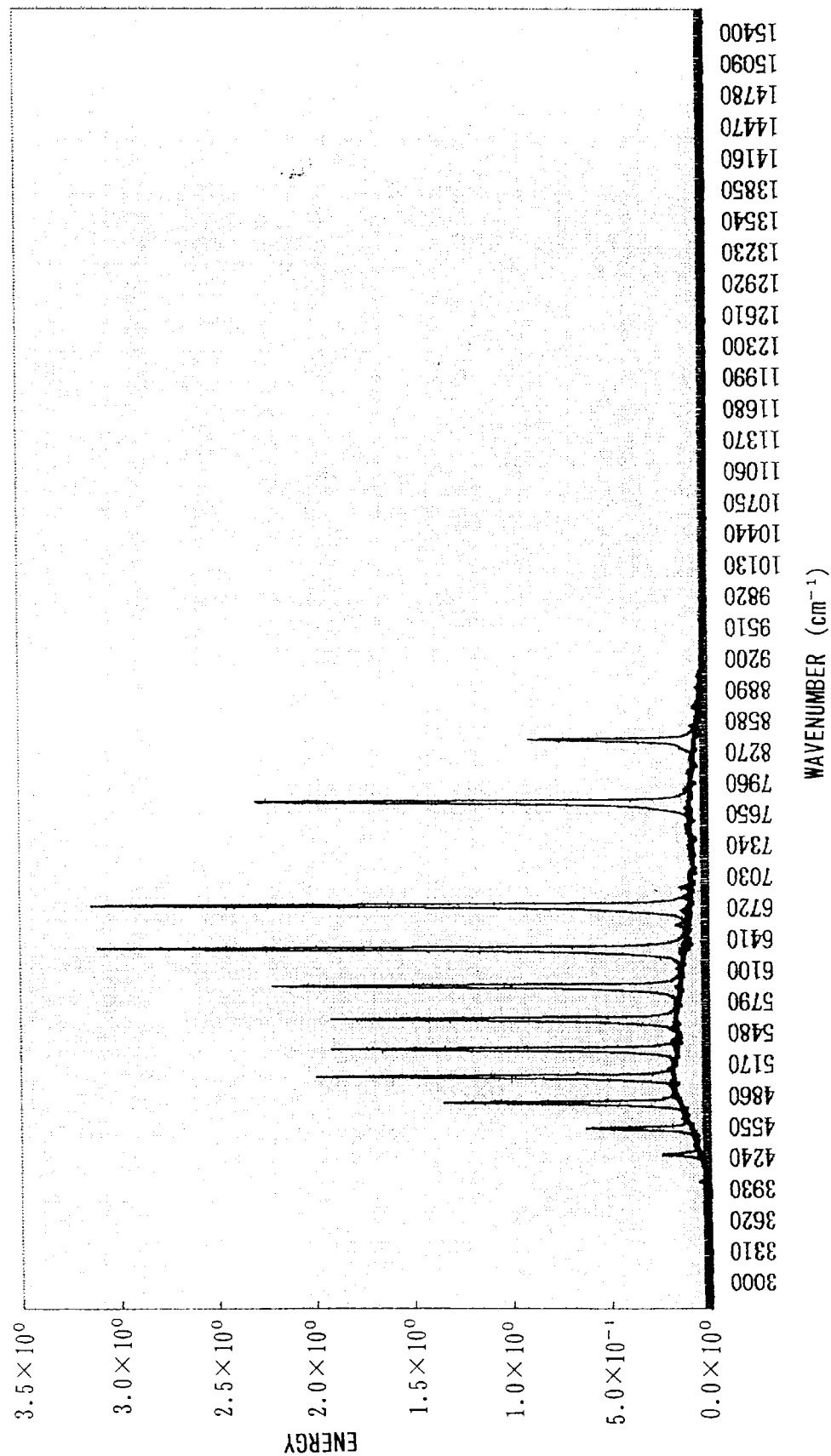
FIG. 12 illustrates a first order diffractive light spectrum of the conventional spectrophotometer shown in FIG. 8B.

FIG. 12 illustrates conventional example of a first order diffractive light spectrum, i.e., the commercially-available spectrophotometer shown in FIG. 8B. Comparing the scale on the vertical axis with those of the embodiments shown in FIGS. 9 and 11, it is understood that the energy intensity is small.

Figure 13:
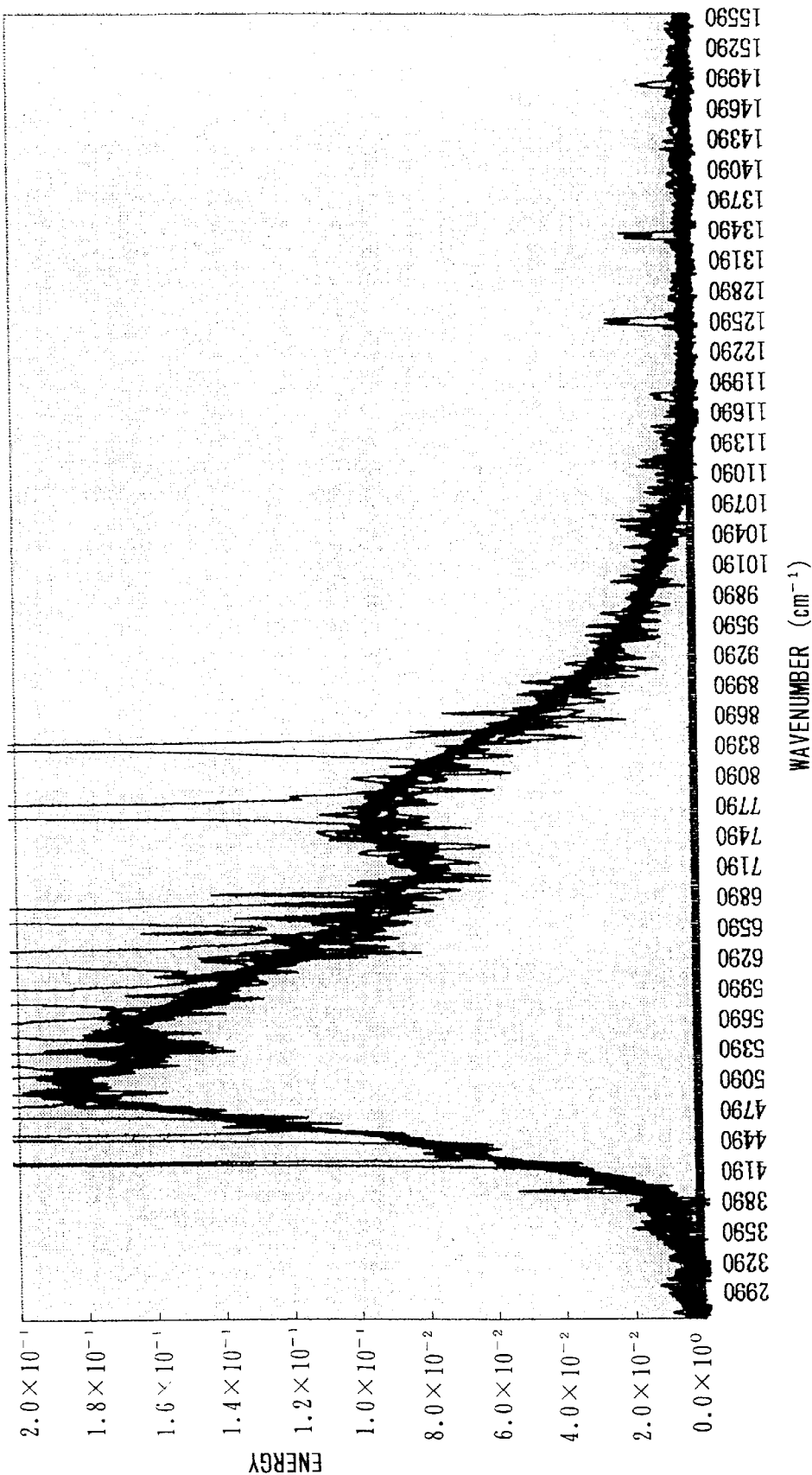
FIG. 13 shows the spectrum of FIG. 12 with improved photosensitivity on the vertical axis.

FIG. 13 is a spectrum measured by increasing the photosensitivity on the vertical axis for the spectrum shown in FIG. 12 to the same magnitude as that of the embodiment shown in FIG. 10. It is also understood that the mixture of zero-order light is remarkable when compared with the embodiment.

Figure 14:
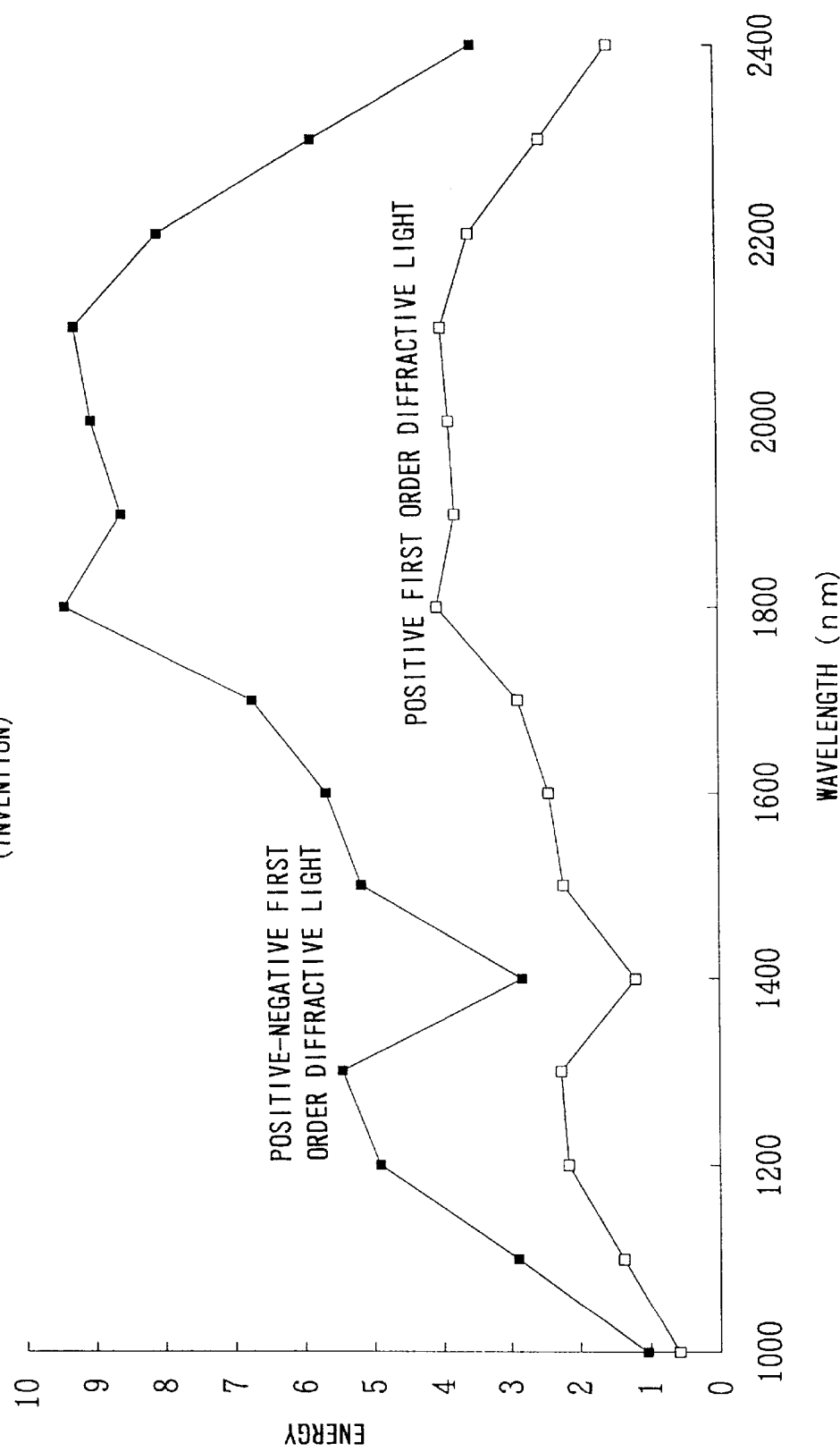
FIG. 14 illustrates and compares the peak energy of positive first order diffractive light and that of positive-negative first order diffractive light in one embodiment.

FIG. 14 compares the peak energy (peak height) of positive first order diffractive light with that of positive-negative (sum of positive first order diffractive light and negative first order diffractive light) peak energy in the embodiment. It is understood that the peak energy of the positive-negative first order diffractive light obtained by composing the positive first order diffractive light with negative first order diffractive light is about twice that of the positive first order diffractive light.

Figure 15:
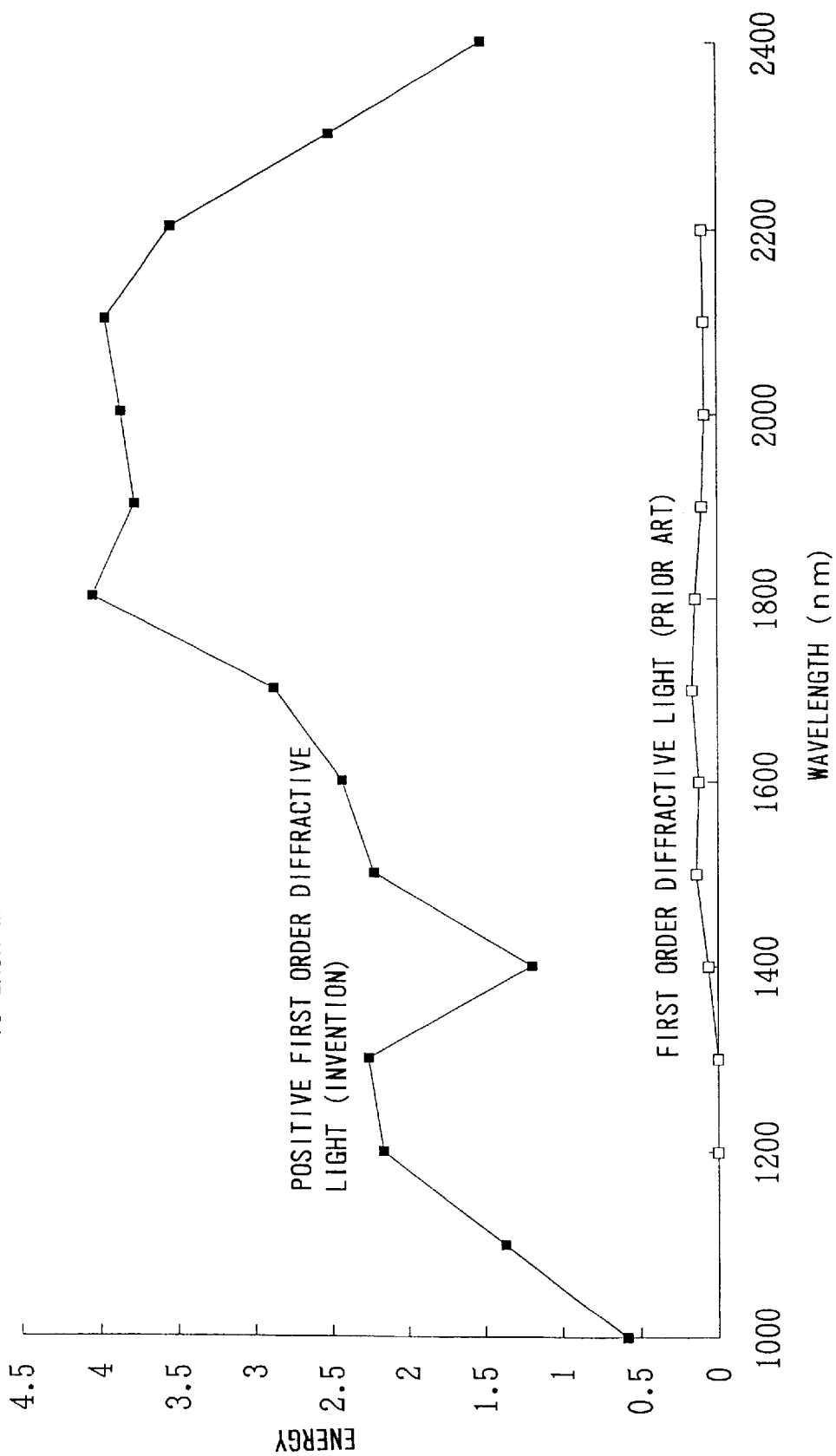
FIG. 15 illustrates the peak energy of positive first order diffractive light in one embodiment and compares it to that of first order diffractive light in a comparable example.

FIG. 15 illustrates and compares the peak energy of positive first order diffractive light in the embodiment and that of first order diffractive light in the conventional. It is understood that the peak energy of the first order diffractive light in the embodiment is far larger than that of the comparative example.

Figure 16:
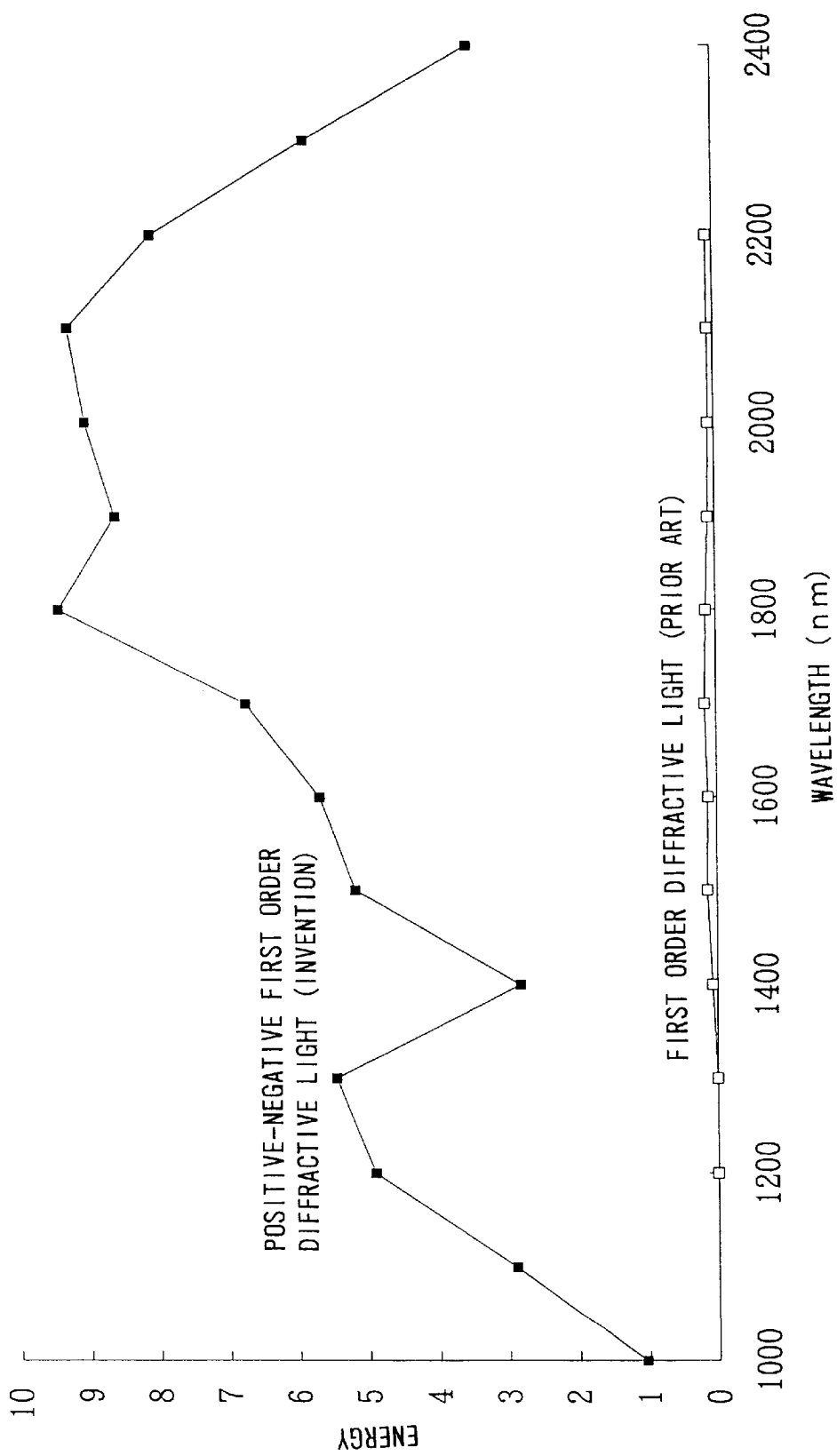
FIG. 16 illustrates and compares the peak energy of positive-negative first order diffractive light in one embodiment and that of first order diffractive light in a comparable example.

FIG. 16 illustrates and compares the peak energy of the positive-negative first order diffractive light in the embodiment and that of first order diffractive light of the conventional device. It is understood that the peak energy of the first order diffractive light in the embodiment is even larger than that of the comparative example.

Figure 17:
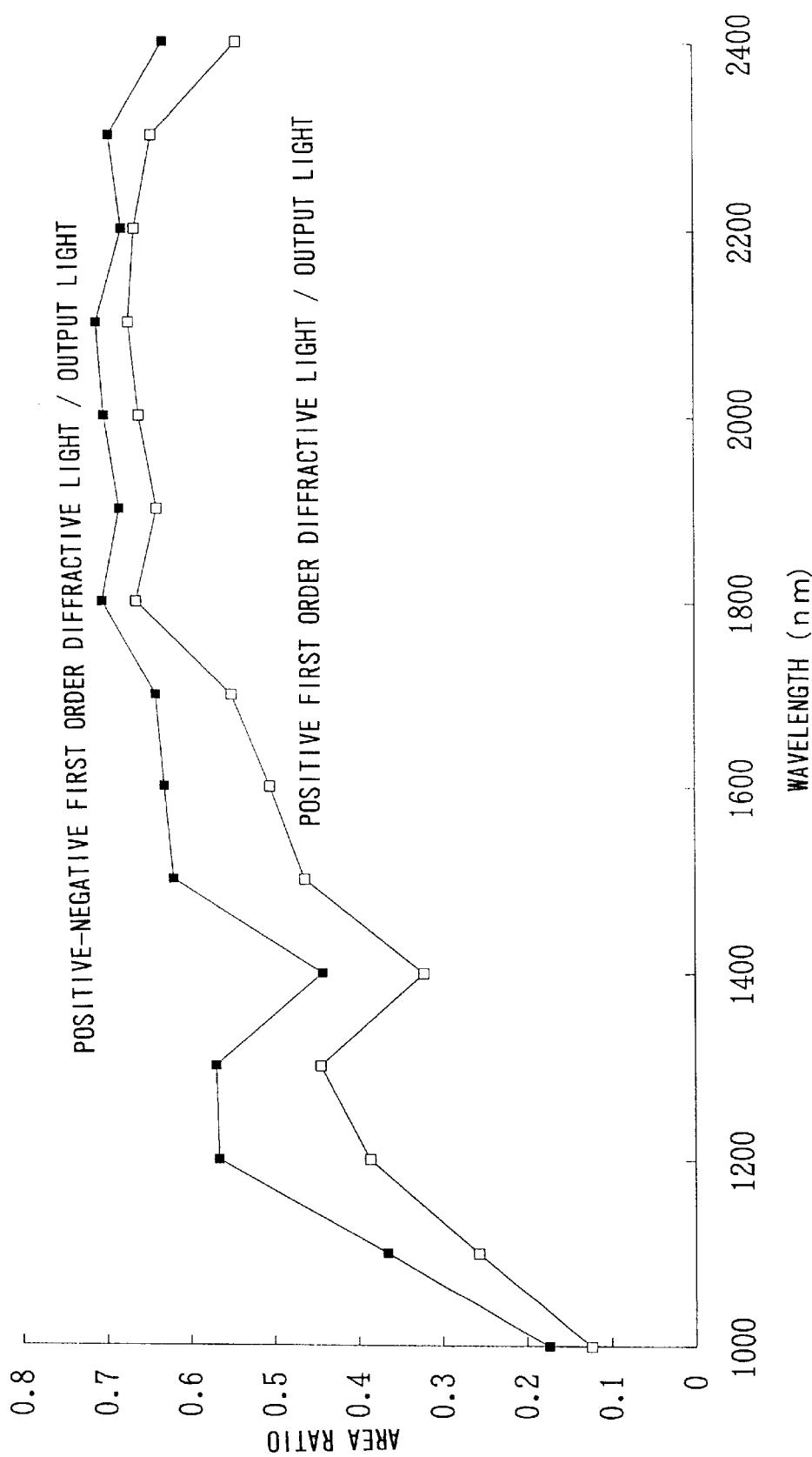
FIG. 17 illustrates the peak area ratios of positive first order diffractive light and positive-negative first order diffractive light to output light in one embodiment.
Figure 18:
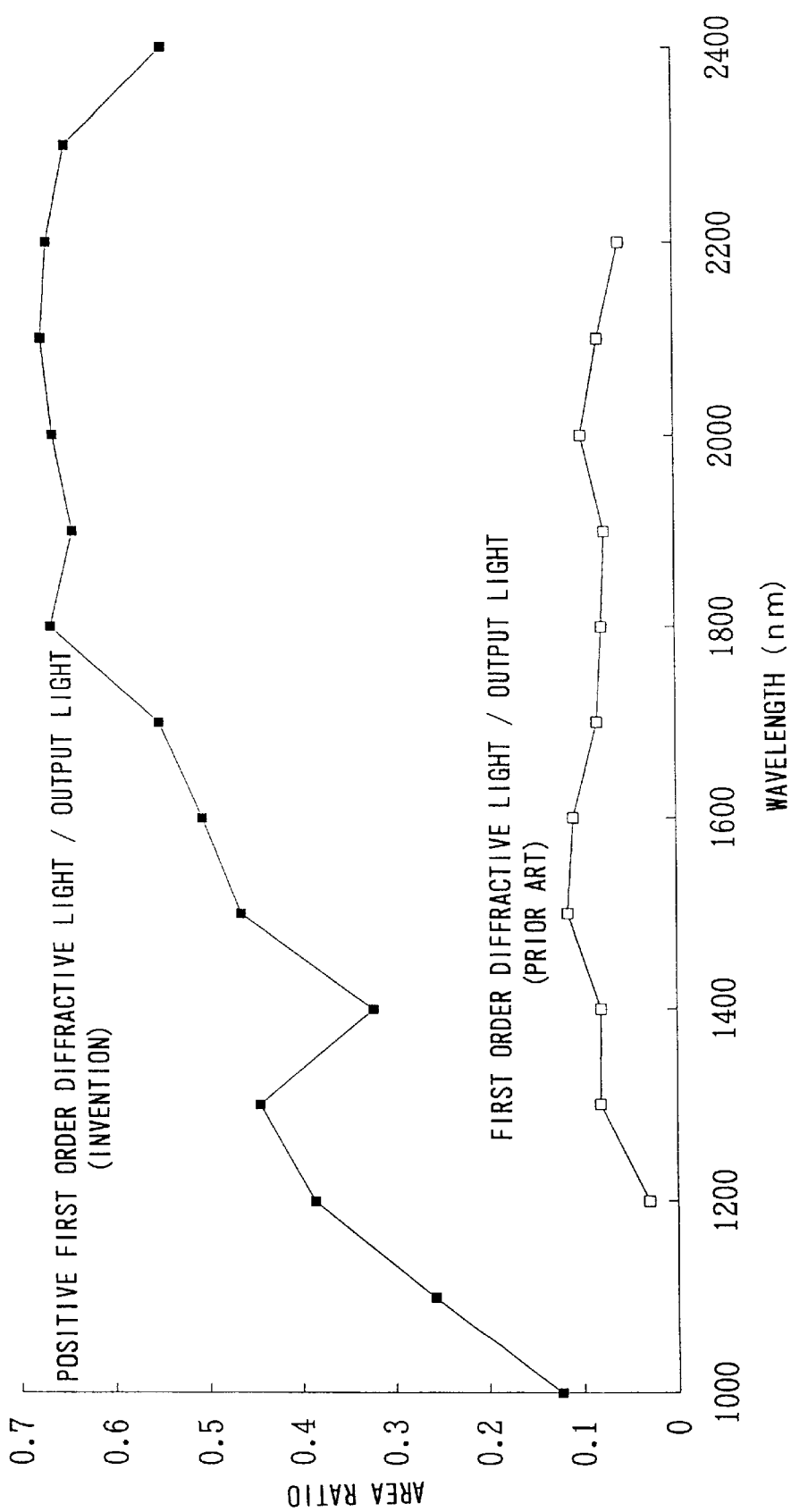
FIG. 18 illustrates peak area ratios of positive first order diffractive light in one embodiment and first order diffractive light of a comparative example to output light.
Figure 19:
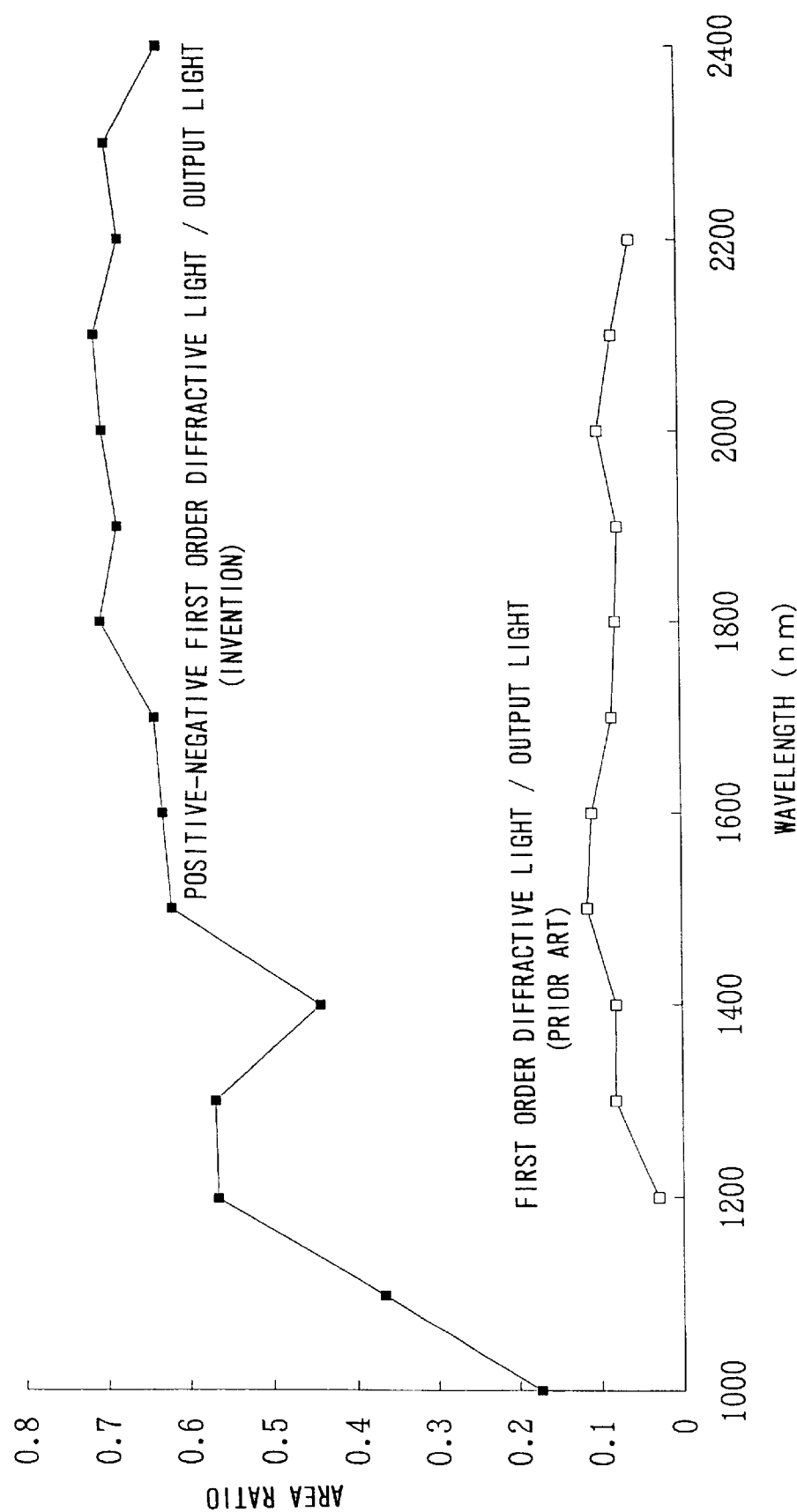
FIG. 19 illustrates the peak area ratios of positive-negative first order diffractive light in one embodiment and first order diffractive light to output light in a comparable example.

FIG. 17 illustrates the peak area ratios of positive first order diffractive light and positive-negative first order diffractive light to output light in the embodiment. The peak area ratio indicates a ratio of the energy of the first order diffractive light occupied in the total energy of output light (including both the first order diffractive light and mixed zero-order light) outgoing from the acousto-optic device in ratio of the peak areas at each wavelength within the region of 1000–2400 nm. The meaning of the peak area ratio in the below mentioned FIGS. 18 and 19 is the same as that in FIG. 17. The purity of the first order diffractive light is increased when positive first order diffractive light and negative first order diffractive light are combined with each other as compared with the case of employing exclusively positive or exclusively negative first order diffractive light.

FIG. 18 illustrates the peak area ratios of positive first order diffractive light in the embodiment and first order diffractive light of the conventional device in the comparative example to output light. It is understood that the purity of the first order diffractive light is higher in the embodiment.

FIG. 19 illustrates the peak area ratios of positive-negative first order diffractive light in the embodiment and first order diffractive light in the conventional device of comparative example to output light. It is understood that the purity of the first order diffractive light is further increased in the embodiment as compared with the comparative example.

Figure 20:
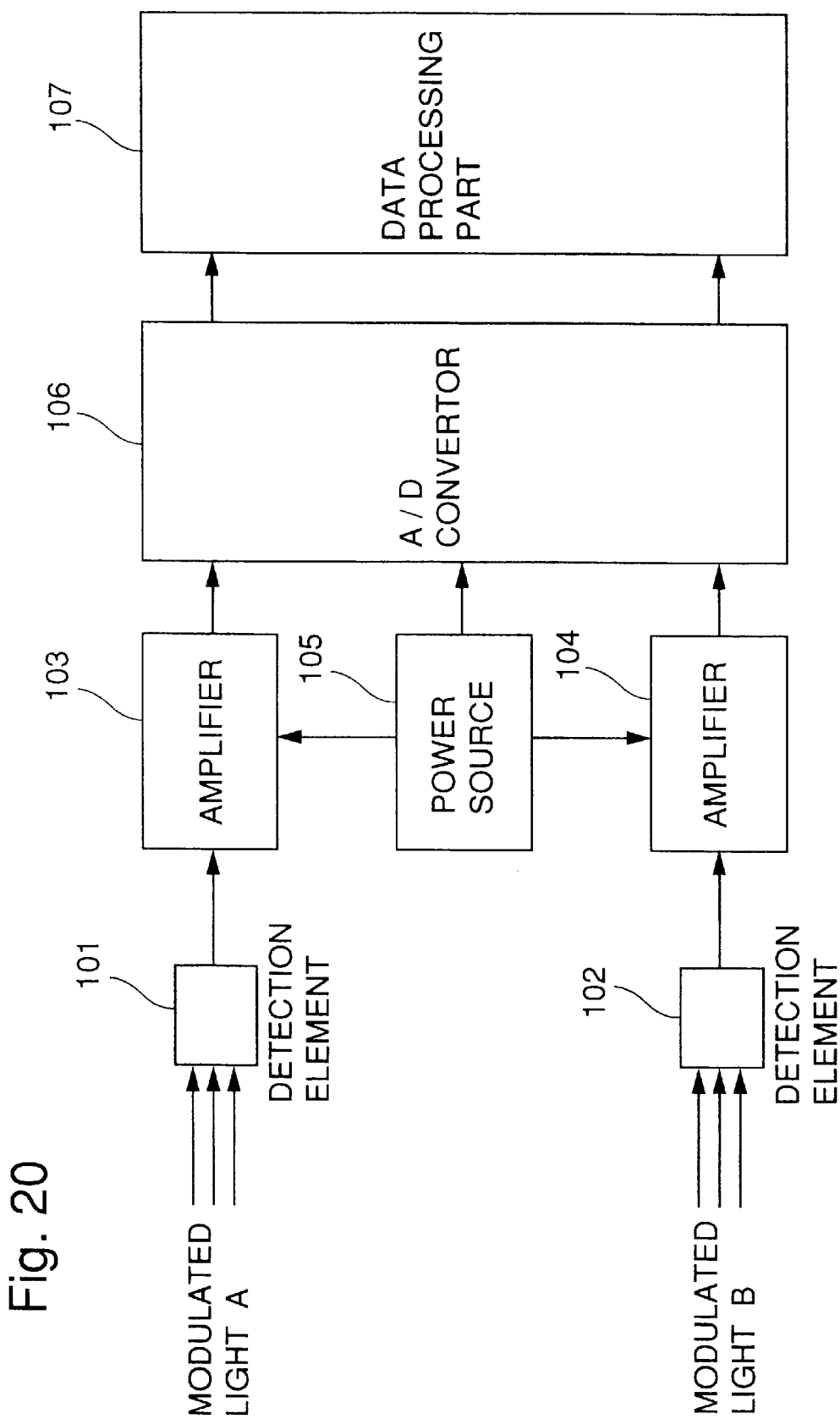
FIG. 20 is a block diagram schematically showing a photodetection device part in one embodiment of an optical measuring device.

FIG. 20 schematically illustrates an exemplary photodetection device 204. Detection elements 101 and 102 respectively receive measuring light A of first order diffractive light modulated by acousto-optic device 4 and reference light B of zero-order light similarly modulated. Detection elements 101 and 102 are PbS elements. Detection outputs of detection elements 101 and 102 are inputted in and amplified by amplifiers 103 and 104 each outputting a plurality of signals of different degrees of amplification. The plurality of output signals of different degrees of amplification from each of the amplifiers 103 and 104 are retrieved in a computer, data processing part 107, through A-D convertor 106. Numeral 105 denotes the power source for amplifiers 103 and 104.

Data processing part 107 comprises channel selection means receiving a plurality of output signals from A-D convertor 106 and selecting non-saturated values of amplifiers 103 and 104 or A-D convertor 106 while maintaining the largest amplification degree from these signals, synchronous signal processing means synchronously signal-processing the selected signal at a modulation frequency modulating the measuring light, and integration means integrating the signal subjected to synchronous signal processing.

Figure 21:
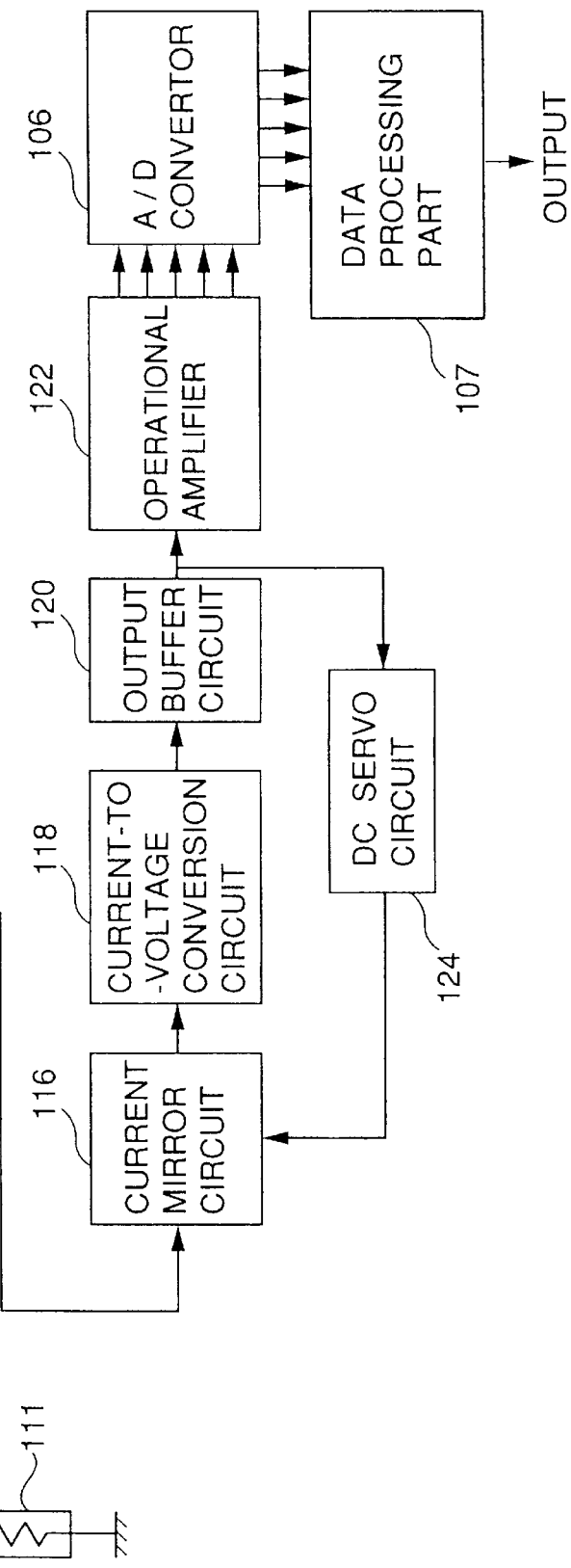
FIG. 21 is a block diagram showing a amplifier in an embodiment of the optical measuring device.

FIG. 21 illustrates the flow of signal processing for a signal detected by detection elements 101 or 102 shown in FIG. 20 from detection to data processing in data processing part 107. The circuit structure formed by detection element 101, amplifier 103 and power source 105 is identical to that formed by detection element 102, amplifier 104 and power source 105, PbS element 111 shown in FIG. 21 corresponds to detection element 101 or 102 in FIG. 20, while PbS element bias circuit 110 and a structural part from input buffer circuit 112 to operational amplifier 122 in FIG. 21 correspond to amplifiers 3 or 4 in FIG. 20. PbS element bias circuit 110 is provided to supply a constant current to PbS element 111. Output voltage fluctuation of PbS element 111 receiving modulated light is inputted in the input buffer circuit 112. Voltage-to-current conversion circuit 114 converts the output voltage fluctuation of input buffer circuit 112 to current fluctuation by means of a resistive element. Current-to-voltage conversion circuit 118 inputs the current fluctuation from the voltage-to-current conversion circuit 114 through current mirror circuit 116, and converts same to voltage fluctuation amplified in a prescribed magnification by means of a resistive element. Operational amplifier 122 inputs a voltage fluctuation output of current-to-voltage conversion circuit 118 through output buffer circuit 120 and outputs a plurality of signals of different magnifications to A-D convertor 106, while data processing part 107 calculates a measured value.

Figure 22:
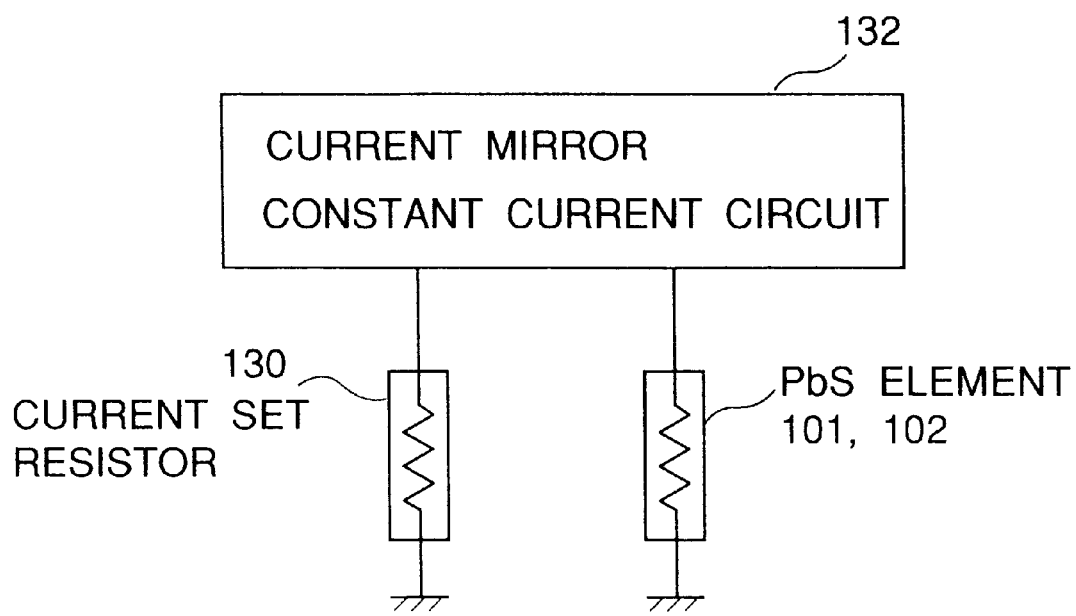
FIG. 22 is a block diagram showing an exemplary bias circuit of a PbS element in an embodiment of the optical measuring device.

The respective parts of this amplifier will now be described in more detail. Bias circuit 110 operates as a constant current source, supplying a bias voltage of a maximum of 14 V to PbS element 111. An example of bias circuit 110 is current mirror constant current circuit 132 the current of which is set by current set resistor 130, and supplies a constant bias current to PbS element 111, as shown in FIG. 22. The bias current flowing to PbS element 111 is set by current set resistance Rs as follows, for example:

$$\text{Bias Current} = 14.0/\text{Rs} \text{ [A]}$$

where Rs>PbS element dark resistance.

Further reference to FIG. 21. When light enters PbS element 111, its resistance value is changed and a voltage drop proportionate to the resistance value of the element takes place across PbS element 111.

Input buffer circuit 112 receives the voltage drop of PbS element 111 as an input signal. Input and output parts of input buffer circuit 112 are a source-follower circuit by an N-channel FET and an emitter-follower circuit by a bipolar transistor, which are high input and low output impedance circuits at an amplification degree of 1.

Voltage-to-current conversion circuit 114 is formed by only a fixed resistor. Assuming that Vo represents an output voltage of input buffer circuit 112, Rio represents an output resistance of input buffer circuit 112, Rci represents an input resistance of current mirror circuit 116, and Rvi represents the resistance of voltage-to-current conversion circuit 114, the input current for the current mirror circuit 116 is as follows:

$$\text{Current Mirror Circuit Input Current} = \text{Vo}/(\text{Rio}+\text{Rvi}+\text{Rci})$$

Current mirror circuit 116 operates as a current buffer of low input impedance and high output impedance at a current amplification degree of 1.

Current-to-voltage conversion circuit 118 is formed by only a fixed resistor, and assuming that Io represents an output current of current mirror circuit 116, Roi represents an input resistance of output buffer circuit 120 and Riv represents the resistance of current-to-voltage conversion circuit 118, the input voltage of output buffer circuit 120 is as follows:

$$\text{Output Buffer Input Voltage} = \text{Io} \cdot \text{Riv} \cdot \text{Roi}/(\text{Riv}+\text{Roi})$$

Output buffer circuit 120 is an emitter-follower circuit by a bipolar transistor, and has high input impedance and low output impedance at an amplification degree of 1.

The output from output buffer circuit 120 is branched and inputted in four operational amplifiers 122. Operational amplifiers 122 are employed as non-inverting amplifiers, and form an amplifier circuit generating outputs at four amplification factors of 1, 5, 25 and 100 times.

DC servo circuit 124 applies the negative feedback of a DC area, in order to prevent elements forming the circuit from breakage when excessive DC offset or drift is caused in output buffer circuit 120.

In the amplifier shown in FIG. 21, output voltages (amplifier output voltages) from operational amplifiers 122 are expressed with respect to resistance Rd of PbS element 111 in the following equation:

Amplifier Output Voltage =

$(Vb \cdot Rd / Rs)[\{Riv \cdot Roi / (Riv + Roi)\} / (Rio + Rvi + Rci)] \times$ (operational amplifier amplification degree)

where Vb represents a bias circuit voltage (voltage across the bias current set resistor), Rd represents PbS element resistance (Ω), Rs represents bias current set resistance (Ω), Rio represents input buffer output resistance (Ω), Rvi represents voltage-to-current conversion resistance (Ω), Rci represents current mirror circuit input resistance (Ω), Riv represents current-to-voltage conversion resistance (Ω), and Roi represents output buffer input resistance (Ω).

In general, Rvi >>(Rio+Rci) and Riv<< Roi, and hence the amplifier output voltage is as follows:

Amplifier Output Voltage≈(Vb·Rd/Rs)(Riv/Rvi)×(operational amplifier amplification degree)

Figure 23:
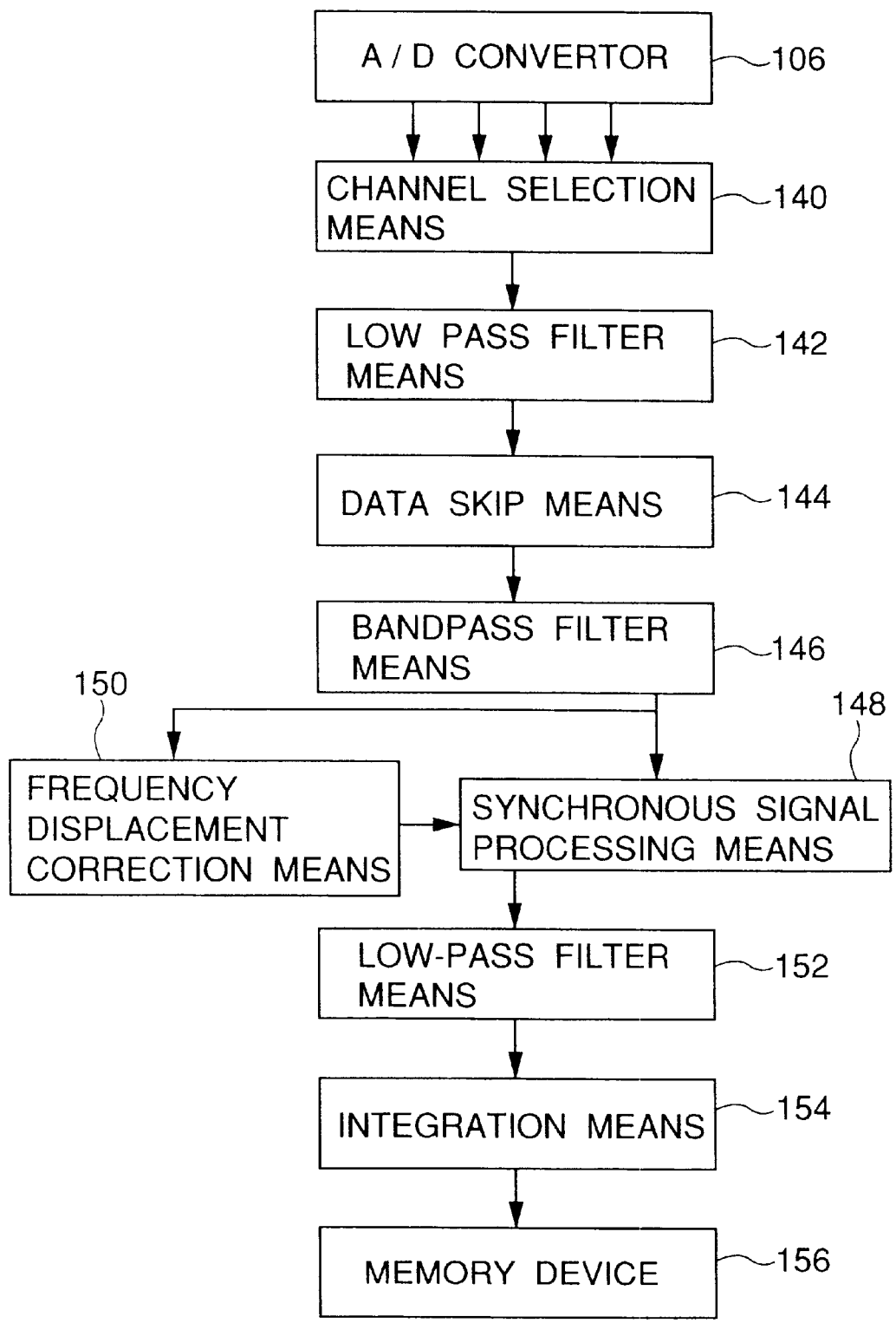
FIG. 23 is a block diagram showing an embodiment of the function of the data processing part.

FIG. 23 is a block diagram showing the function of data processing part 107. Data processing part 107 performs synchronous signal processing on PbS element output data stored in a data file, storing the result in the data file. With reference to FIG. 20, similar data processing is performed in the two systems of detection elements 101 and 102.

Channel selection means 140 selects data of the maximum analog input channel without saturating the signal from amplifiers 103 or 104 shown in FIG. 20 from a plurality of analog input channels in each system for a measuring signal and a reference signal, converts same to a real number, which it then stores in a specified buffer circuit. In channel selection, A-D data of 16-bit resolution is determined as saturated when it is "8000H" or "7FFFH". Conversion from an integer type to a real number type of A-D data is performed according to the following equation:

Real Number Data=(integer data)×(10.0/32768)×(corrected amplification degree)×(calibration data).

Assuming that there are four analog input channels from operational amplifiers 122 to A-D convertor 106 shown in FIG. 21 for each system for measuring signals and reference signals, and amplifier amplification degrees in each system are 100,000, 25,000, 5,000 and 1,000 times at channels 0, 1, 2 and 3 respectively, corrected amplification degrees are 0.01, 0.04, 0.2 and 1.0 respectively.

Calibration data is adapted to correct errors between the amplification degrees of the respective inputs. Data processing part 107 comprises instrumental error preservation means comparing a plurality of outputs of different degrees of amplification from the amplifier in the case of inputting a signal of a constant amplitude in the amplifier and preserving instrumental errors between the outputs of different degrees of amplification as the calibration data. Data processing part 107 also comprises amplifier output correction means correcting the output of the amplifier by using the instrumental errors preserved in the instrumental error preservation means.

The quantity of data measured at a high sampling frequency per unit time is increased due to the high sampling frequency. Therefore, data processing part 107 comprises low-pass filter means 142 eliminating a high-frequency component from the signal selected by channel selection means 140 and data skip means 144 regarding a value extracted from a signal train passed through low-pass filter means 142, every unit number as a signal value. Processing with a smaller data quantity is enabled by skip processing.

The apparent sampling frequency is reduced by the skip processing, and hence a spectrum of aliasing noise corresponding to the sampling frequency is superposed on a frequency spectrum of the measured value. The frequency spectrum immediately after A-D conversion is periodically distributed about a frequency of integral times the sampling frequency Fs in the period of the sampling frequency Fs. When 1/2skip processing, for example, is performed on this signal, a spectrum about the sampling frequency Fs changes to a spectrum about Fs/2. Consequently, aliasing noise about Fs/2 appears in a signal band as a noise component, to reduce the signal-to-noise ratio. Low-pass filter processing is performed before the skip processing in order to prevent this.

In order to extract only a modulation frequency component of the signal from the skipped data, synchronous signal processing means 148 performs synchronous signal processing for accurately extracting only the modulation frequency component. A bandpass filter with a passband at the modulation frequency is employed for improving the signal-to-noise ratio of the synchronous signal processing before the synchronous signal processing.

The frequency of the signal may be displaced from the modulation frequency before the synchronous signal processing, and hence the accuracy of the synchronous signal processing can be improved by correcting this displacement. Frequency displacement correction means 150 measures the displacement between the frequency of the signal inputted in synchronous signal processing means 148 and the modulation frequency, and corrects the synchronizing frequency of synchronous signal processing means 148 on the basis of the result. In this correction, a point where the input signal changes from positive to negative or negative to positive (zero crosspoint) is obtained and the frequency of the input signal is obtained from the distance of the zero crosspoint. Synchronous signal processing of excellent synchronization accuracy is implemented by deciding this frequency as a local oscillation frequency.

A constant value (dc component) is required from the signal modulated by synchronous signal processing, the high-frequency component is eliminated by low-pass filter means 152.

The data passed through low-pass filter means 152 is integrated by digital integration means 154. An amplitude value of the measuring signal is obtained by the integration. The accuracy of integration is improved as its time constant is increased. Therefore, calculation is previously converged at a value close to the true value with a small time constant and the value is then converged with a large time constant as an initial value, thereby improving the calculation speed. The integrated data is preserved in memory device 156.

When the power supply voltage of the amplifier is actually measured with a measuring device and corrected by taking a ratio to a previously set reference voltage, displacement of the absolute value of the measured value can be corrected. Therefore, data processing part 107 further comprises measurement result correction means measuring the power supply voltage of the amplifier and correcting the result of measurement by a ratio to the previously-set reference voltage.

This data processing is performed in respect to the measuring light and the reference light independently of one another. A drift component of the measured value is eliminated by dividing and correcting the data processing result of a measuring light detection signal by that of a reference light detection signal.

Figure 24:
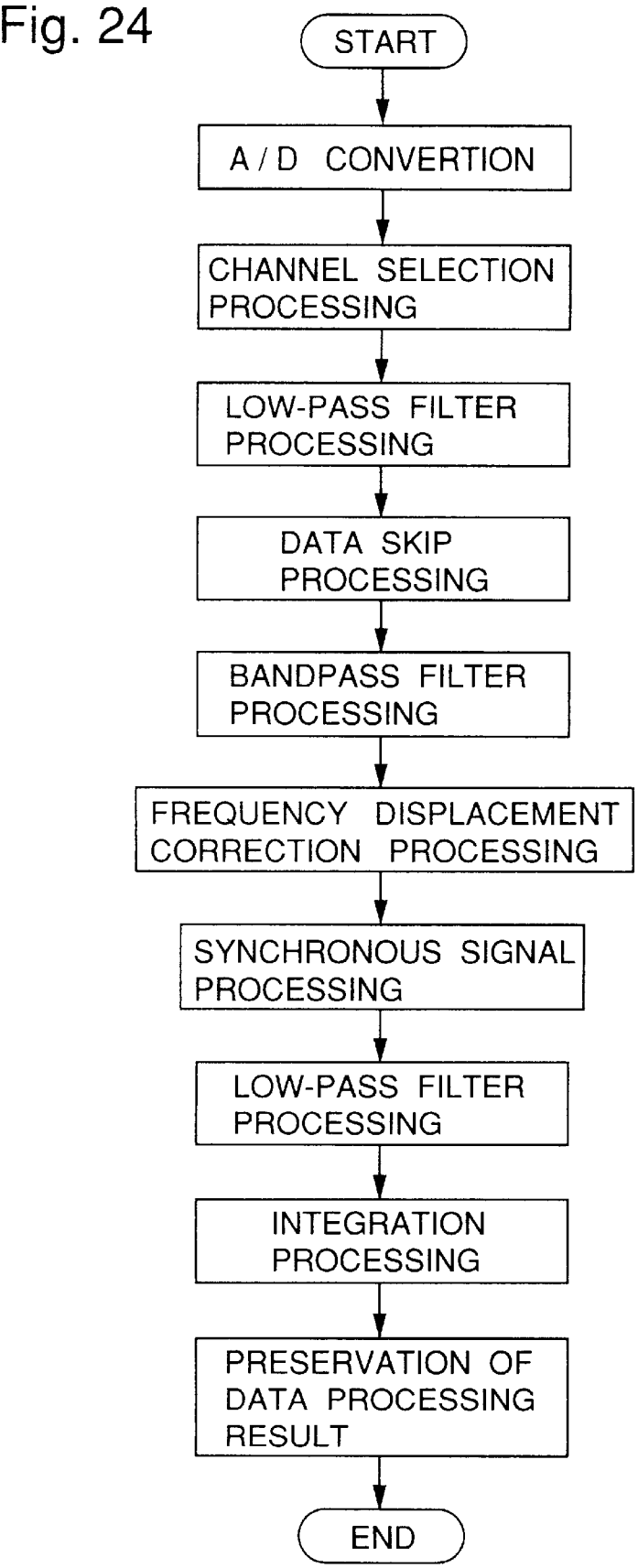
FIG. 24 is a flow chart showing an embodiment of the operation of the data processing part.

FIG. 24 is a flow chart showing the operation in data processing part 107. A plurality of outputs of different amplification degrees from the amplifier are A-D converted, for selecting non-saturation of signals while maintaining the maximum degree of amplification. The selected signal is subjected to low-pass filter processing, and thereafter subjected to the data skip processing of regarding a value extracted per unit number as a signal value. In order to eliminate random noise from the skipped data, synchronous signal processing is performed through bandpass filter processing. In the synchronous signal processing, displacement between the frequency of the signal and the modulation frequency is measured for correcting the synchronizing frequency. A high-frequency component is removed from the signal subjected to synchronous signal processing by low-pass filter processing, and thereafter integration processing is performed for preserving data.

Although the present invention has been described and illustrated in detail, it is clearly understood that this has been by way of illustration and example only and is not to be taken by way of limitation, the spirit and scope of the present invention being limited only by the terms of the appended claims.

What is claimed is:

1. A spectroscopic light equipment comprising:

a light source;

an acousto-optic device comprising an acoustic wave transducer on an acousto-optic crystal serving as a spectroscopic element separating light into its spectral components by changing the acoustic wave frequency being supplied to said acousto-optic crystal;

a light source optical system introducing light from said light source into said acousto-optic device in a luminous flux smaller than the size of a window of said acousto-optic device as a ray with a propagation angle smaller than the allowed angle of said acousto-optic device;

a condensing optical system condensing zero-order light, positive first order diffractive light and negative first order diffractive light outgoing from said acousto-optic device on positions spatially different from each other; and an irradiation optical system for irradiating a target with at least either said positive or negative first order diffractive light condensed by said condensing optical system, wherein said irradiation optical system is an optical system composing said positive first order diffractive light and said negative first order diffractive light condensed by said condensing optical system on the same optical axis and irradiating said target with same.

2. The spectroscopic light equipment in accordance with claim 1, wherein said light source optical system comprises a premirror arranged at a front portion on an optical axis of said light source for reflecting said light from said light source toward said acousto-optic device, and an optical system bringing a specular surface of said premirror into a conjugate relation with an incidence plane of said acousto-optic device.

3. The spectroscopic light equipment in accordance with claim 2, further comprising a postmirror being arranged at a back portion on said optical axis of said light source for reflecting said light from said light source toward said premirror.

4. The spectroscopic light equipment in accordance with claim 1, wherein said end portion of said irradiation optical system receiving said positive or negative first order diffractive light is set on a focal plane of said condensing optical system.

5. A spectroscopic light equipment comprising:

a light source;

an acousto-optic device comprising an acoustic wave transducer on an acousto-optic crystal serving as a spectroscopic element separating light into its spectral components by changing the acoustic wave frequency being supplied to said acousto-optic crystal;

a light source optical system introducing light from said light source into said acousto-optic device in a luminous flux smaller than the size of a window of said acousto-optic device as a ray with a propagation angle smaller than the allowed angle of said acousto-optic device;

a condensing optical system condensing zero-order light, positive first order diffractive light and negative first order diffractive light outgoing from said acousto-optic device on positions spatially different from each other; and an irradiation optical system for irradiating a target with at least either said positive or negative first order diffractive light condensed by said condensing optical system, wherein a branched optical fiber member with three branched first end portions and a single joined second end portion is employed as said irradiation optical system, and said positive first order diffractive light and said negative first order diffractive light condensed by said condensing optical system enter two of said three branched first end portions of said branched optical fiber member, so that output light of outgoing light from said joined second end portion by said target enters said second end portion again and is guided to a photodetection device by the remaining one of said three branched first end portions.

6. The spectroscopic light equipment in accordance with claim 1, wherein a plurality of acousto-optic devices with different spectral wavelength regions are serially arranged on an optical path of said light source optical system, so that any said acousto-optic device is selected and driven.

7. A spectroscopic light equipment comprising:

a light source:

an acousto-optic device comprising an acoustic wave transducer on an acousto-optic crystal serving as a spectroscopic element separating light into its spectral components by changing the acoustic wave frequency being supplied to said acousto-optic crystal;

a light source optical system introducing light from said light source into said acousto-optic device in a luminous flux smaller than the size of a window of said acousto-optic device as a ray with a propagation angle smaller than the allowed angle of said acousto-optic device:

a condensing optical system condensing zero-order light, positive first order diffractive light and negative first order diffractive light outgoing from said acousto-optic device on positions spatially different from each other; and an irradiation optical system for irradiating a target with at least either said positive or negative first order diffractive light condensed by said condensing optical system, wherein a branched optical fiber member with first end portions branched into at least two and a single joined second end portion is employed as said irradiation optical system, and said positive first order diffractive light and said negative first order diffractive light condensed by said condensing optical system enter respective said branched end portions of said branched optical fiber member, so that said target is irradiated with light outgoing from said joined second end portion.

8. The spectroscopic light equipment in accordance with claim 1, wherein output light from said acousto-optic device is modulated by the strength modulation of a driving signal for said acoustic wave transducer or mechanical chopping of light entering said acousto-optic device.

9. A photodetection device comprising:

a modulation means for modulating measuring light;

a detection element outputting a signal responsive to said measuring light;

an amplifier inputting an output of said detection element and simultaneously outputting a plurality of signals of different degrees of amplification;

an A-D convertor converting said plurality of output signals of different degrees of amplification from said amplifier to digital signals; and a data processing part at least comprising channel selection means inputting said plurality of output signals from said A-D convertor and selecting a non-saturated value of said amplifier or said A-D convertor while maintaining the largest said degree of amplification from said signals, synchronous signal processing means superposing selected said signal with an oscillation signal synchronous with a modulation frequency modulating said measuring light, and integration means obtaining a measured value by integration of said signal being subjected to synchronous signal processing.

10. The photodetection device in accordance with claim 9, wherein said amplifier comprises:

an input buffer circuit inputting a modulated output of said detection element;

a voltage-to-current conversion circuit converting output voltage fluctuation of said input buffer circuit to current fluctuation by means of a resistive element;

a current-to-voltage conversion circuit converting said current fluctuation by said voltage-to-current conversion circuit to voltage fluctuation amplified in a prescribed magnification by means of a resistive element; and an amplifier circuit inputting a current fluctuation output of said current-to-voltage conversion circuit through an output buffer circuit and outputting a plurality of signals of different magnifications.

11. The photodetection device in accordance with claim 9, wherein said data processing part further comprises low-pass filter means eliminating a high-frequency component unnecessary for said synchronous signal processing from said signal selected by said channel selection means and data skip means regarding a value being extracted from a signal train passed through said low-pass filter means every unit number at a constant interval as a signal value between said channel selection means and said synchronous signal processing means.

12. The photodetection device in accordance with claim 9, wherein said synchronous signal processing means further comprises bandpass filter means passing said modulation frequency therethrough on a front stage thereof.

13. The photodetection device in accordance with claim 9, further comprising frequency displacement correction means measuring displacement between a frequency of a signal inputted in said synchronous signal processing means and said modulation frequency and correcting the synchronizing frequency of said synchronous signal processing means on the basis of the result.

14. The photodetection device in accordance with claim 9, further comprising low-pass filter means for eliminating a high-frequency component unnecessary for said integration processing between said synchronous signal processing means and said integration means.

15. The photodetection device in accordance with claim 9, wherein said integration means is adapted to perform integration processing of a proper time with a proper integration time constant for regarding the result as an initial value and performing integration processing again with an integration time constant larger than said integration time constant.

16. The photodetection device in accordance with claim 9, further comprising instrumental error preservation means comparing a plurality of outputs of said amplifier with different degrees of amplification in the case of inputting a signal of a constant amplitude in said amplifier with each other and preserving the results as instrumental errors between said outputs with different degrees of amplification, and amplifier output correction means correcting said outputs of said amplifier by said instrumental errors preserved in said instrumental error preservation means.

17. The photodetection device in accordance with claim 9, further comprising measurement result correction means measuring the power supply voltage of said amplifier and correcting the measurement result by its ratio to a previously set reference voltage.

18. The photodetection device in accordance with claim 9, wherein said detection element and said amplifier are provided for both measuring light detection and reference light detection, said A-D convertor is adapted to convert both a measuring light detection signal and a reference light detection signal to digital signals, and said data processing part is adapted to also perform similar data processing as to said reference light detection signal, for dividing and correcting the data processing result of said measuring light detection signal by that of said reference light detection signal.

19. An optical measuring device comprising light equipment irradiating a target with light, a photodetection device receiving and detecting output light by said target as measuring light, and a control part for controlling operations of said light equipment and said photodetection device, wherein said light equipment comprises;

a light source, an acousto-optic device comprising an acoustic wave transducer on an acousto-optic crystal serving as a spectroscopic element, an acousto-optic device driving unit changing an acoustic wave frequency supplied from said acoustic wave transducer to said acousto-optic crystal and separating light into its spectral components, a light source optical system introducing light from said light source into said acousto-optic device in a luminous flux smaller than the size of a window of said acousto-optic device as a ray with a propagation angle smaller than the allowed angle of said acousto-optic device, a condensing optical system condensing positive first order diffractive light and negative first order diffractive light outgoing from said acousto-optic device on positions spatially different from each other, an irradiation optical system irradiating said target with at least either said positive or negative first order diffractive light condensed by said condensing optical system, and a modulation means modulating output light from said acousto-optic device, and said photodetection device comprises;

a detection element outputting a signal responsive to the fluctuation of modulated said measuring light, an amplifier inputting an output of said detection element and simultaneously outputting a plurality of signals of different amplification degrees, an A-D convertor converting said plurality of output signals of different degrees of amplification from said amplifier to digital signals respectively, and a data processing part at least comprising channel selection means inputting said plurality of output signals from said A-D convertor and selecting a non-saturated value of said amplifier or said A-D convertor while maintaining the largest said degree of amplification from said signals, synchronous signal processing means superposing selected said signal with an oscillation signal synchronous with a modulation frequency modulating said measuring light, and integration means obtaining a measured value by the integration of said signal subjected to synchronous signal processing.

20. The optical measuring device in accordance with claim 19, wherein said modulation means is implemented by said acousto-optic device driving unit, and said output light from said acousto-optic device is modulated by strength modulation of a driving signal for said acoustic wave transducer.

21. The optical measuring device in accordance with claim 19, wherein said modulation means is a chopper mechanically chopping said light entering said acousto-optic device.

22. The optical measuring device in accordance with claim 19, wherein said light source optical system comprises a premirror arranged at a front portion on an optical axis of said light source for reflecting said light from said light source toward said acousto-optic device, and an optical system bringing a specular surface of said premirror into a conjugate relation with an incidence plane of said acousto-optic device.

23. The optical measuring device in accordance with claim 22, wherein said light source optical system further comprises a postmirror being arranged at a back portion on said optical axis of said light source for reflecting said light from said light source toward said premirror.

24. The optical measuring device in accordance with claim 19, wherein said irradiation optical system is an optical system composing said positive first order diffractive light and said negative first order diffractive light condensed by said condensing optical system on the same optical axis and irradiating said target with same.

25. The optical measuring device in accordance with claim 19, wherein a branched optical fiber member with first end portions branched into at least two and a joined second end portion is employed as said irradiation optical system, and said positive first order diffractive light and said negative first order diffractive light condensed by said condensing optical system enter respective said branched end portions of said branched optical fiber member, so that said target is irradiated with light outgoing from said joined second end portion.

26. The optical measuring device in accordance with claim 25, wherein a branched optical fiber member with three branched first end portions and a single joined second end portion is employed as said irradiation optical system, and said positive first order diffractive light and said negative first order diffractive light condensed by said condensing optical system enter two of said three branched end portions of said branched optical fiber member, so that output light of outgoing light from said joined second end portion by said target enters said joined second end portion again and is guided to a photodetection device by the remaining one of said three branched end portions.

27. The optical measuring device in accordance with claim 19, wherein said end portion of said irradiation optical system receiving said positive or negative first order diffractive light is set on a focal plane of said condensing optical system.

28. The optical measuring device in accordance with claim 19, wherein a plurality of acousto-optic devices with different spectral wavelength regions are serially arranged on an optical path of said light source optical system, so that any said acousto-optic device is selected and driven.

29. The optical measuring device in accordance with claim 19, wherein said amplifier comprises:

an input buffer circuit inputting a modulated output of said detection element, a voltage-to-current conversion circuit converting output voltage fluctuation of said input buffer circuit to current fluctuation by means of a resistive element, a current-to-voltage conversion circuit converting said current fluctuation by said voltage-to-current conversion circuit to voltage fluctuation amplified in a prescribed magnification by means of a resistive element, and an amplifier circuit inputting a voltage fluctuation output of said current-to-voltage conversion circuit through an output buffer circuit and outputting a plurality of signals of different magnifications.

30. The optical measuring device in accordance with claim 19, wherein said data processing part further comprises low-pass filter means eliminating a high-frequency component unnecessary for said synchronous signal processing from said signal selected by said channel selection means and data skip means regarding a value being extracted from a signal train passed through said low-pass filter means every unit number at a constant interval as a signal value between said channel selection means and said synchronous signal processing means.

31. The optical measuring device in accordance with claim 19, wherein said synchronous signal processing means further comprises bandpass filter means passing said modulation frequency therethrough on a front stage thereof.

32. The optical measuring device in accordance with claim 19, further comprising frequency displacement correction means measuring displacement between the frequency of a signal inputted in said synchronous signal processing means and said modulation frequency and correcting the synchronizing frequency of said synchronous signal processing means on the basis of the result.

33. The optical measuring device in accordance with claim 19, further comprising low-pass filter means for eliminating a high-frequency component unnecessary for said integration processing between said synchronous signal processing means and said integration means.

34. The optical measuring device in accordance with claim 19, wherein said integration means is adapted to perform integration processing of a proper time with a proper integration time constant for regarding the result as an initial value and performing integration processing again with an integration time constant larger than said integration time constant.

35. The optical measuring device in accordance with claim 19, further comprising instrumental error preservation means comparing a plurality of outputs of said amplifier with different degrees of amplification in the case of inputting a signal of a constant amplitude in said amplifier with each other and preserving the results as instrumental errors between said outputs with different degrees of amplification, and amplifier output correction means correcting said outputs of said amplifier by said instrumental errors preserved in said instrumental error preservation means.

36. The optical measuring device in accordance with claim 19, further comprising measurement result correction means measuring the power supply voltage of said amplifier and correcting the measurement result by its ratio to a previously set reference voltage.

37. The optical measuring device in accordance with claim 19, wherein said detection element and said amplifier are provided for both measuring light detection and reference light detection, said A-D convertor is adapted to convert both a measuring light detection signal and a reference light detection signal to digital signals, and said data processing part is adapted to also perform similar data processing as to said reference light detection signal, for dividing and correcting a data processing result of said measuring light detection signal by that of said reference light detection signal.

* * * * *